United States Patent
Gibson et al.

(10) Patent No.: US 10,838,488 B2
(45) Date of Patent: Nov. 17, 2020

(54) EVALUATING ALIGNMENT OF INPUTS AND OUTPUTS FOR VIRTUAL ENVIRONMENTS

(71) Applicant: PlutoVR, Seattle, WA (US)

(72) Inventors: Mark Gibson, Seattle, WA (US); Jared Cheshier, Seattle, WA (US); Jean-Luc Rene Bouthemy, Sammamish, WA (US); Brian Douglas, Kirkland, WA (US)

(73) Assignee: PlutoVR, Seattle, WA (US)

( * ) Notice: Subject to any disclaimer, the term of this patent is extended or adjusted under 35 U.S.C. 154(b) by 58 days.

(21) Appl. No.: 16/156,738

(22) Filed: Oct. 10, 2018

(65) Prior Publication Data
US 2020/0117270 A1  Apr. 16, 2020

(51) Int. Cl.
*G06F 3/01* (2006.01)
*G06T 15/20* (2011.01)
(Continued)

(52) U.S. Cl.
CPC .............. *G06F 3/013* (2013.01); *G06T 7/74* (2017.01); *G06T 7/75* (2017.01); *G06T 15/20* (2013.01);
(Continued)

(58) Field of Classification Search
CPC ........ G06F 3/011; G06F 3/0346; G06F 3/013; G06T 15/20; G06T 2219/024; G06T 19/006; G06T 17/00; H04N 7/157
See application file for complete search history.

(56) References Cited

U.S. PATENT DOCUMENTS

2012/0206333 A1  8/2012  Kim
2013/0076853 A1*  3/2013  Diao ................. H04N 7/15
                                                348/14.08
(Continued)

FOREIGN PATENT DOCUMENTS

WO    WO2014192117    12/2014

OTHER PUBLICATIONS

Office action for U.S. Appl. No. 16/156,818, dated Apr. 24, 2019, Gibson, "Aligning Virtual Representations to Inputs and Outputs", 7 pages.
(Continued)

*Primary Examiner* — Kenneth Bukowski
(74) *Attorney, Agent, or Firm* — Lee & Hayes, P.C.

(57) ABSTRACT

Techniques and architectures for establishing and/or evaluating a communication session that enables users from the same physical environment, different physical environments, or a combination to interact in a virtual coordinate system and perceive each other as being present are described herein. In some examples, representations of users may be aligned within a coordinate system while maintaining spatial alignment of the user in a physical environment and/or spatial alignment of the representations in another coordinate system. In some examples, a representation of a user may be output to another user in a manner that is aligned to input for the user. In some examples, a human model may be created for a user and used to provide representations of users that map to a human. In some examples, a representation of a user may be evaluated to determine if the representation is properly aligned to the user and/or a coordinate system.

27 Claims, 16 Drawing Sheets

(51) Int. Cl.
*G06T 7/73* (2017.01)
*G06T 19/00* (2011.01)
*G06T 17/00* (2006.01)
*H04N 7/15* (2006.01)
*G06F 3/0346* (2013.01)
*G06F 3/16* (2006.01)

(52) U.S. Cl.
CPC ............ *G06T 17/00* (2013.01); *G06T 19/006* (2013.01); *G06F 3/016* (2013.01); *G06F 3/0346* (2013.01); *G06F 3/16* (2013.01); *G06T 2207/30201* (2013.01); *G06T 2219/024* (2013.01); *H04N 7/157* (2013.01)

(56) References Cited

U.S. PATENT DOCUMENTS

| | | | |
|---|---|---|---|
| 2013/0198625 A1* | 8/2013 | Anderson | G06F 3/016 715/701 |
| 2014/0168056 A1 | 6/2014 | Swaminathan et al. | |
| 2014/0184724 A1 | 7/2014 | Cho | |
| 2014/0267584 A1 | 9/2014 | Atzpadin et al. | |
| 2016/0026253 A1 | 1/2016 | Bradski et al. | |
| 2016/0086367 A1 | 3/2016 | Shuster et al. | |
| 2017/0277257 A1* | 9/2017 | Ota | G06F 3/013 |
| 2018/0101989 A1 | 4/2018 | Frueh et al. | |
| 2018/0254038 A1* | 9/2018 | Kawano | G10L 15/10 |
| 2018/0311570 A1* | 11/2018 | Buchanan | A63F 13/42 |
| 2019/0130599 A1* | 5/2019 | Gebbie | G06F 3/011 |
| 2019/0180509 A1 | 6/2019 | Laaksonen et al. | |
| 2019/0391637 A1* | 12/2019 | Taylor | A63F 13/87 |

OTHER PUBLICATIONS

Non Final Office Action dated Oct. 25, 2019 for U.S. Appl. No. 16/156,776 "Reference Frames for Virtual Environments" Gibson, 19 pages.
"ARWorldMap", retrieved on Jul. 19, 2018 at <<https://developer.apple.com/documentation/arkit/arworldmap >>, 3 pages.
"MPEG-4 Face & Body Animation", Visage Technologies, Face Tracking & Analysis, retrieved on Jul. 19, 2018 at <<http://visagetechnologies.com/mpeg-4-face-and-body-animation/ >>, 3 pages.
"MPEG-4 Face and Body Animation (MPEG-4 FBA)—an Overview", Visage Technologies AB, retrieved on Jul. 19, 2018 at <<http://visagetechnologies.com/uploads/2012/08/MPEG-4FBAOverview.pdf>>, 66 pages.
"Pluto" retrieved on Jul. 20, 2018 at <<https://store.steampowered.com/app/389980/Pluto/>>, 4 pages.
"Spatial anchors", retrieved on Jul. 19, 2018 at <<https://docs.microsoft.com/en-us/windows/mixed-reality/spatial-anchors >>, 3 pages.
"TheParallaxView—Illusion of depth by 3D head tracking on iPhone X", retrieved on Jul. 27, 2018 at <<http://www.anxious-bored.com/blog/2018/2/25/theparallaxview-illusion-of-depth-by-3d-head-tracking-on-iphone-x >>, 20 pages.
The PCT Search Report and Written Opinion dated Jan. 10, 2020 for PCT Application No. PCT/US19/55462, 8 pages.

* cited by examiner

EVALUATING ALIGNMENT OF INPUTS AND OUTPUTS FOR VIRTUAL ENVIRONMENTS

BACKGROUND

Many systems enable users to connect over a network. For example, Virtual Reality (VR) systems allow users to control avatars or other virtual representations within a virtual environment. In particular, a first user at a first location may use a VR headset or other device to interact with a second user at a second location. In another example, Augmented Reality (AR) systems allow users to experience a physical world with augmented content. Specifically, a first user and a second user at a same location may view real-time images of a physical world with virtual content that is overlaid on the real-time images. In yet another example, users may communicate through a video conference system by viewing real-time images of each other. Although these systems enable users to interact with each other in a virtual manner, they suffer various setbacks. For example, VR systems generally place users within their own virtual environment. This often causes users that are located in the same physical environment to run into each other or otherwise contact each other as they move within the physical environment. Further, AR systems generally allow users that are in the same physical environment to interact but lack support for remote users. Moreover, these systems provide relatively high-level interaction that fails to mimic how humans actually communicate. For example, video conferencing systems require a user to look into a camera in order to appear to another user as making eye contact. Furthermore, since different types of systems and/or systems with multiple components are used to connect users over a network, the systems are prone to losing one or more aspects of the interaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
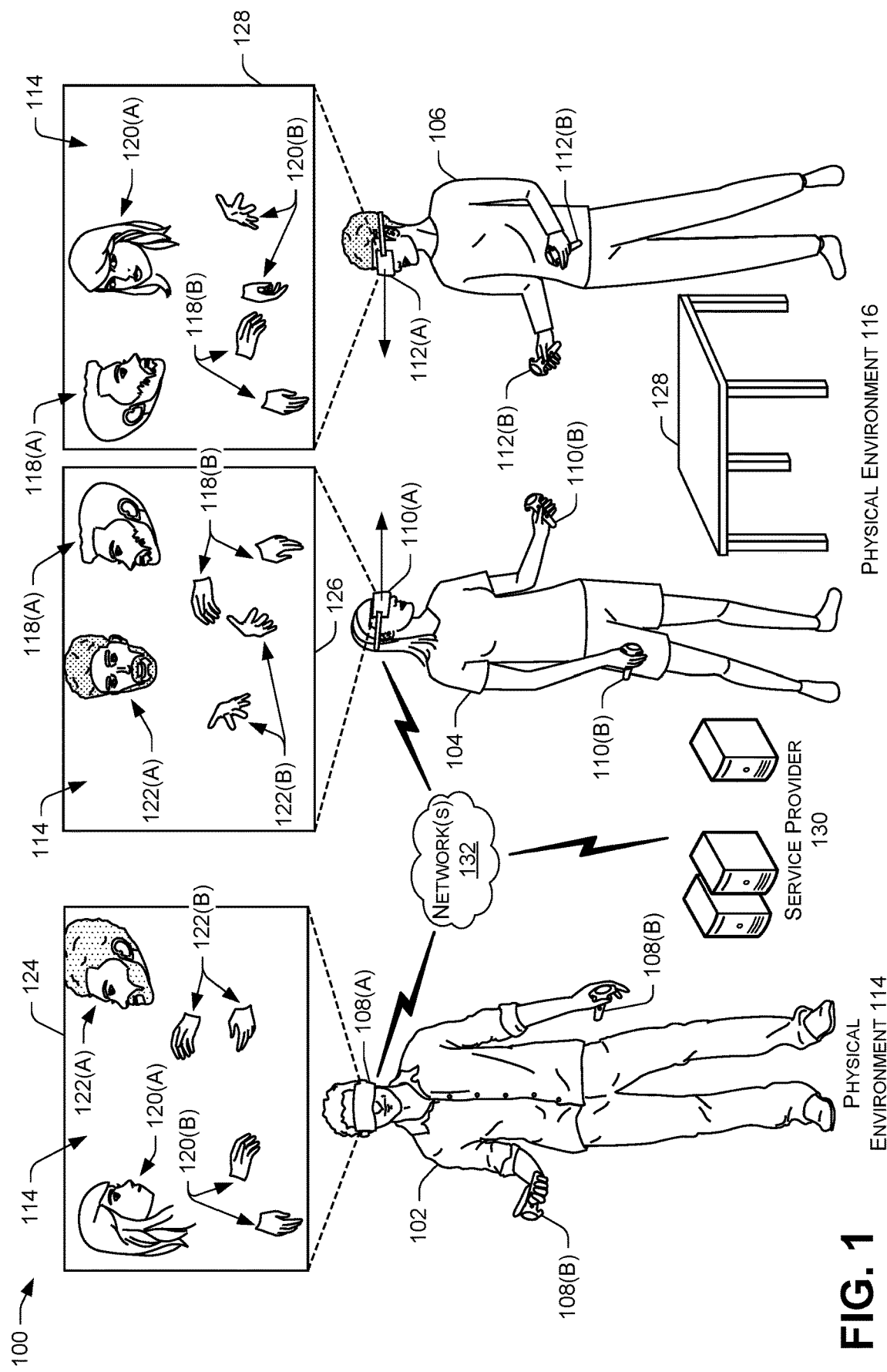
FIG. 1 illustrates an example architecture in which techniques described herein may be implemented.

This disclosure describes, in part, techniques and architectures for establishing a communication session that enables users from the same physical environment, different physical environments, or a combination to interact in a virtual coordinate system and perceive each other as being present (also referred to as "shared presence"). In some examples, representations of users may be aligned within a coordinate system (e.g., a virtual environment) while maintaining spatial alignment of the users in a physical environment and/or spatial alignment of the representations in another coordinate system. To illustrate, composite spatial data may be used to represent two users from a first physical environment within a virtual environment and to represent a user from another physical environment within the virtual environment while maintaining positioning of the two users relative to each other. Further, in some examples, a representation of a user may be output to another user in a manner that is aligned to input for the user. To illustrate, when a first user is looking at eyes of a representation of a second user that is displayed to the first user, a representation of the first user may be displayed to the second user with eyes that are looking at the second user. Further, in some examples, a human model may be created for a user and used to provide representations of users that map to an actual human. To illustrate, a distance between eyes of a representation for a user may correspond to a distance between actual eyes of the user.

This disclosure also describes, in part, techniques and architectures for evaluating representations and/or users to ensure that a communication session maintains shared presence. In some examples, a representation of a user may be evaluated during a communication session to determine if the representation is properly aligned to the user and/or a coordinate system. To illustrate, a direction in which a first user perceives a representation for a second user looking, as displayed by a device associated with the first user, may be compared to a direction in which a device for the second user indicates that the representation for the second user is looking. If the directions are the same within a threshold amount, then the communication session has shared presence. While if the directions are not the same within a threshold amount, then the communication session has lost shared presence.

As noted above, in some examples, representations of users may be aligned within a coordinate system while maintaining spatial alignment of the users in a physical environment and/or spatial alignment of the representations in another coordinate system. For example, assume that a first device associated with a first user, a second device associated with a second user, and a third device associated with a third user are involved in a communication session. Also, assume that the first device and the second device are located in a first physical environment, and the third device is located in a second physical environment. The first user may be associated with a first representation, the second user may be associated with a second representation, and the third user may be associated with a third representation. Here, a computing device (e.g., the first device, the second device, a service provider, etc.) may identifying first spatial data indicating a first reference frame for the first user and the second user, a position of the first user or the first representation relative to the first reference frame, and a position of the second user or the second representation relative to the first reference frame. The first reference frame may be a common spatial anchor in the first physical environment (or a virtual point in a virtual environment, in some cases). The computing device may also identify second spatial data indicating a second reference frame for the third user and a position of the third user or the third representation relative to the second reference frame. The second reference frame may be an anchor point in the second physical environment and/or another virtual point.

The computing device may then generate composite spatial data for the first user, the second user, and the third user, since they are part of the same communication session. The composite spatial data may include the first spatial data and the second spatial data. The composite spatial data may indicate a virtual point that is shared for the first spatial data and the second spatial data. The composite spatial data may indicate the position of the first user/representation, the position of the second user/representation, and/or the position of the third user/representation relative to the virtual point. In some examples, the composite spatial data maintains spatial data for a wide variety of physical and/or virtual environment, so that users in multiple physical and/or virtual environments may maintain existing spatial alignment. In some examples, composite spatial data includes spatial data for each user or device that is part of a communication session.

The computing device may use the composite spatial data to position the first representation, the second representation, and/or the third representation. For example, the computing device may display, via the first device, the second representation for the second user within a coordinate system at a position that is based on the first spatial data included in the composite spatial data. This may maintain the spatial alignment of the first user and the second user in the first physical environment. For example, if the first user is looking at the second user in the first physical environment, then the first representation will be represented in the coordinate system as looking at the second representation. Further, the computing device may display, via the first device, the third representation for the third user within the coordinate system at a position that is based on the second spatial data included in the composite spatial data. In some examples, composite spatial data may assist in positioning users that are associated with nested environments (e.g., allow a first user that is in both a physical environment and a virtual environment to communicate in a shared environment with a second user that is in both a physical environment and another virtual environment).

In some examples, a representation of a user may be output to another user in a manner that is aligned to the user. For example, assume that a first device associated with a first user and a second device associated with a second user are involved in a communication session. The first user may be represented with a first representation and the second user may be represented with a second representation. In this example, eyes of the first representation may be aligned to a direction in which eyes of the first user are looking relative to an object or person that is displayed to the first user. Similarly, eyes of the second representation may be aligned to a direction in which eyes of the second user are looking relative to an object or person that is displayed to the second user.

To facilitate such alignment, a computing device (e.g., the first device, the second device, a service provider, etc.) may determine a first direction in which eyes of the first user are looking relative to the second representation that is displayed by the first device. The computing device may also determine a position and/or orientation of the second user relative to the second device. The computing device may use such determinations to cause the first representation to be displayed via the second device with eye representations that look in a second direction relative to the second user that aligns with the first direction in which eyes of the first user are looking relative to the second representation that is displayed by the first device. For example, if the first user is looking into eyes of the representation of the second user that is displayed by the first device, the first representation may be displayed on the second device to the second user as looking into the eyes of the second user. Similarly, eye representations of the second representation may be aligned. This may avoid a user from having to look directly into a sensor (e.g., camera) to appear as looking into the eyes of another user.

In some examples, a human model may be created for a user and used to provide representations of users that map to an actual human. For example, a device may capture data about a user, such as a facial data about a user's face, hand data about a user's hand(s), etc. The data may be used to form a human model that represents the user. In some instances, the human model is specific to a user. In other instances, a variety of data is collected overtime to create a more generic human model that represents multiple users. In any event, the human model may be used to provide a representation for a user within a coordinate system. In particular, the representation for the user may include features that correspond to features of the human model (e.g., include similar sizes/shapes, similar positioning of features, etc.).

In some examples, a representation for a user may include only features that corresponds to a human model. To illustrate, if a device is only able to capture head data and hand data for a user (e.g., due to the user using only a headset and hand controllers), a representation for the user may include just a head and hands. However, in other illustrations, a representation for a user may include any number of features that may or may not correspond to a human model.

Further, in some instances, a representation of a user may be evaluated during a communication session to check that features of the representation accurately reflect a human model. To illustrate, if a hand of a representation is located a first distance from a head of the representation, the first distance may be compared to a second distance between a hand on the human model and a head on the human model. If the first distance is greater than the second distance, this may indicate that the hand of the representation is no longer tied to the human model (e.g., a user has stopped using a hand controller and moved away from the hand controller). Upon identifying this, the representation of the user may now be displayed without the hand.

In some examples, representations and/or users may be evaluated to ensure that a communication session maintains shared presence. For example, assume that a first user associated with a first device and a second user associated with a second device are involved in a communication session, with the first user being represented with a first representation and the second representation being represented with a second representation. Here, a location or direction of output of the second representation as perceived by the first user may be evaluated against a location or direction of output of the second representation as perceived by the second user. A similar process may occur for output of the first representation. For example, the first device may identify a first direction in which an eye of the second representation is looking in the coordinate system as displayed by the first device. The first direction may be a direction that the first user perceives (through the first device) the second representation looking. The second device may identify a second direction in which the eye of the second representation is looking in the coordinate system. The second direction may be a direction that the second user is looking in the coordinate system through the second device.

The first direction and the second direction may be evaluated to determine if the first user perceives the second representation looking in a same direction that the second device indicates the second representation as looking. For example, if the first user and the second user are looking at each other (e.g., looking each other in the eyes), the evaluation may check that (i) the first device indicates that the second representation is looking at the first user and (ii) the second device indicates that the second representation is looking at the first representation (e.g., the second user is looking at the eyes of first representation). If the evaluation indicates that the eyes of the second representation are not aligned, the communication session may restart the first device, the second device, and/or an eye tracking sensor, switch to displaying the first representation and/or the second representation without eye data (e.g., without aligning eyes), and/or perform a variety of other operations. By doing so, the techniques may maintain alignment of users and/or representations of the users.

Although many examples are discussed in the context of aligning and/or evaluating eyes, other types of data may be evaluated. For example, the techniques may align and/or evaluate a direction in which sound from a mouth of a representation is perceived, a location of touch on a representation that is perceived, etc.

This brief introduction is provided for the reader's convenience and is not intended to limit the scope of the claims, nor the proceeding sections. Furthermore, the techniques described in detail herein may be implemented in a number of ways and in a number of contexts. Some example implementations and contexts are provided with reference to the following figures, as described below in more detail. It is to be appreciated, however, that the following implementations and contexts are but some of many.

FIG. 1 illustrates an example architecture 100 in which in which techniques described herein may be implemented. The architecture 100 includes users 102, 104, and 106 that are associated with devices 108, 110, and 112, respectively. As illustrated, the user 102 is located in a physical environment 114 (also referred to as real-world environment 114), while the users 104 and 106 are located in a physical environment 116 (also referred to as real-world environment 116). The devices 108, 110, and 112 may provide output, such as by displaying content, outputting sound, vibrating, etc. and/or may receive input, such as through controllers 108(B), 110(B), and 112(B), to enable the users 102, 104, and 106 to interact within a coordinate system 114, such as a virtual environment. Such interaction and/or the coordinate system 114 may form part of a communication session for the users 102, 104, and 106. Although illustrated as Virtual Reality (VR) headsets and controllers (e.g., hand controllers) in FIG. 1, each of the devices 108, 110, and 112 may be any type of computing device, as discussed in further detail in reference to FIG. 6. In the example architecture 100, the user 102 is represented within the coordinate system 114 with a representation 118, the user 104 is represented with a representation 120, and the user 106 is represented with a representation 122. Through the devices 108, 110, and 112, the users 102, 104, and 106 see views 124, 126, and 128, respectively. For example, the view 124 illustrates what the device 108 is currently displaying to the user 102. In some examples, the communication session is implemented in a peer-to-peer (P2P) context with the devices 108, 110, and 112 performing the operations to facilitate the communication session. In other examples, a service provider 130 (sometimes referred to as a remote computing system) performs some or all of the operations to facilitate the communication session. In yet other examples, the communication session may be facilitated in other manners. The devices 108, 110, and 112 and/or the service provider 130 may communicate via one or more networks 132. The one or more networks 132 may include any one or combination of multiple different types of networks, such as cellular networks, wireless networks, Local Area Networks (LANs), Wide Area Networks (WANs), the Internet, and so on.

Although three users and three devices are shown in FIG. 1, any number of users and/or devices may be implemented. Further, although one user 102 is located at the first physical environment 114 and two users 104 and 106 are located at the second physical environment 116, the users 102, 104, and 106 (and/or additional users) may be arranged differently. As such, any number of users and/or devices from any number of physical environments may be part of a communication session. A communication session may include a videotelephony session, a Virtual Reality (VR) session, an Augmented Reality (AR) session, etc.

In the example of FIG. 1, the representations 118, 120, and 122 are each illustrated with just a head and hands. For instance, the representation 118 includes a head representation 118(A) and hand representations 118(B). Here, the head representation 118(A) corresponds to a head component 108(A) of the device 108, such as a headset, while the hand representations 118(B) correspond to hand controllers 108(B) of the device 108. In this example, the representations 118, 120, and 122 include only those features (e.g., body parts) for which human data has been captured. For instance, since the device 108 includes a headset 108(A) and hand controllers 108(B), the device 108 is able to capture data about the head of the user 102 and the hands of the user 102. This human data is used to represent the user 102 with the head representation 118(A) and the hand representations 118(B). In other examples, the representations 118, 120, and 122 may be displayed with other features (e.g., body parts), even if human data (e.g., body data) is not captured for those other features.

In the example of FIG. 1, the representations 120 and 122 are aligned to maintain positioning of the users 104 and 106 within the physical environment 116. As illustrated, the users 104 and 106 are positioned a distance from each other within the physical environment 116 and are looking at each other (e.g., would be looking into each other's eyes if not wearing the devices 110 and 112). As such, the representations 120 and 122 are displayed within the coordinate system 114 a distance from each other and are displayed as looking into each other's eyes. The location of the representations 120 and 122 is correlated to the location of the users 104 and 106 in the physical environment 116 (e.g., is the same, is scaled by a factor, etc.). In many examples, the positioning of the representations 120 and 122 is based on the positioning of the users 104 and 106 relative to a reference frame, such as an anchor point in the physical environment 116. For example, a table 128 may be a common reference frame for the users 104 and 106.

As illustrated in FIG. 1, the user 102 views the representation 120 for the user 104 and views the representation 122 for the user 106 as looking at each other. Further, the user 104 views the representation 122 for the user 106 as looking at the user 104 and views the representation 118 for the user 102 as looking to the side. Additionally, the user 106 views the representation 120 for the user 104 as looking at the user 106, and the representation 118 for the user 102 as looking to the side. In many examples, a representation that is described as looking at a user refers to eyes of the representation looking into eyes of the user, as opposed to more generally looking in a direction of the user.

Figure 2A:
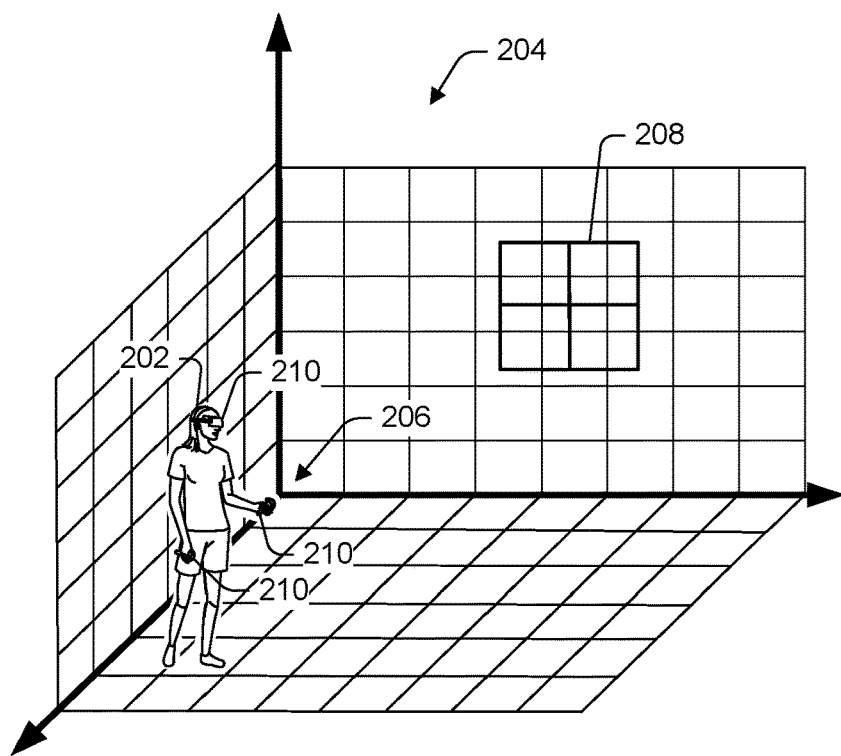
FIG. 2A illustrates a user within a physical environment.
Figure 2B:
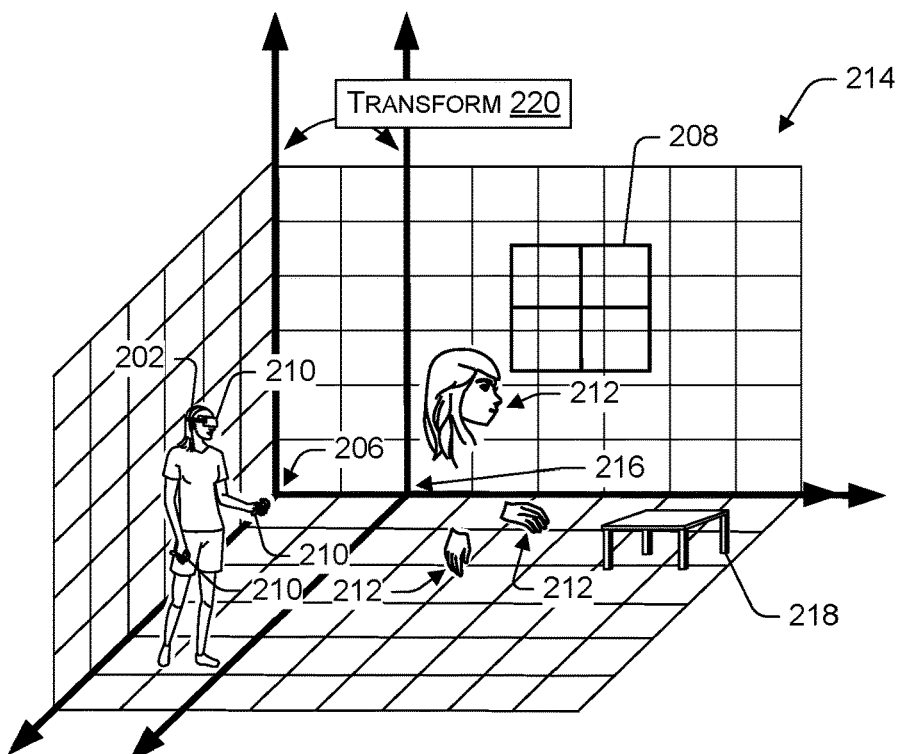
FIG. 2B illustrates a representation for a user within a virtual environment.

FIG. 2A illustrates a user 202 within a physical environment 204 (also referred to as a real-world environment). The physical environment 204 is shown with a coordinate system. Here, the coordinate system is represented with a set of lines that may be used to describe the position of the user 202. In this example, an origin of the coordinate system represents a reference frame 206 for the physical environment 204. Here, the reference frame 206 corresponds to a corner of a room in which the user 202 is located. Although, in other examples, the reference frame 206 of the physical environment 204 may correspond to any physical point or anchor to which an object's state (e.g., position, velocity, etc.) may be referenced. For instance, the reference frame 206 for the physical environment 204 may alternatively be an object in the room (e.g., a VR headset, furniture, a fixture, the Earth, etc.). As illustrated in FIG. 2B, the room includes a window 208.

In some examples, a device 210 that is used by the user 202 may evaluate the physical environment 204 to determine the reference frame 206 and/or the coordinate system. The reference frame 206 may generally be used to track the user 202 within the physical environment 202, provide a representation 212 for the user 202 that correlates to movement of the user 202, etc. In some examples, the device 210 may reevaluate the reference frame 206 and/or determine a new reference frame periodically, when the reference frame 206 is no longer within a distance to the device 210, when the user 202 moves to a new room, etc. Further, in some examples, multiple reference frames may be used for the user 202 within the physical environment 204.

FIG. 2B illustrates the representation 212 for the user 202 within a virtual environment 214. The virtual environment 214 may be described in reference to a coordinate system (e.g., the illustrated lines). As such, the virtual environment 214 may sometimes be referred to as a virtual coordinate system. In this example, an origin of the coordinate system represents a reference frame 216 for the virtual environment 214. Here, the reference frame 216 corresponds to a point in a virtual room in which the representation 212 is located. The reference frame 216 may be any point or anchor (e.g., object) in the virtual environment 214 to which an object's state (e.g., position, velocity, etc.) may be referenced. The reference frame 216 may be the same or different than the reference frame 206 in the physical environment 204. As such, the user 202 may be described in relation to the reference frame 206 in the physical environment 204 and/or the representation 212 may be described in relation to the reference frame 216 in the virtual environment 214. As illustrated, the virtual environment 214 includes a virtual table 218.

The coordinate system of the physical environment 204 may be described in relation to the coordinate system of the virtual environment 214, or vice versa. A box 220 indicates that the origin of the coordinate system of the virtual environment 214 may be transformed from the origin of the coordinate system of the physical environment 204, such as offset, rotated, scaled, etc. Although the origin of the coordinate system of the virtual environment 214 is offset from the origin of the coordinate system of the physical environment 204 in this example, in other examples the origins may be the same. Further, although the coordinate systems are illustrated as being the same, the coordinate systems may be different.

Figure 3:
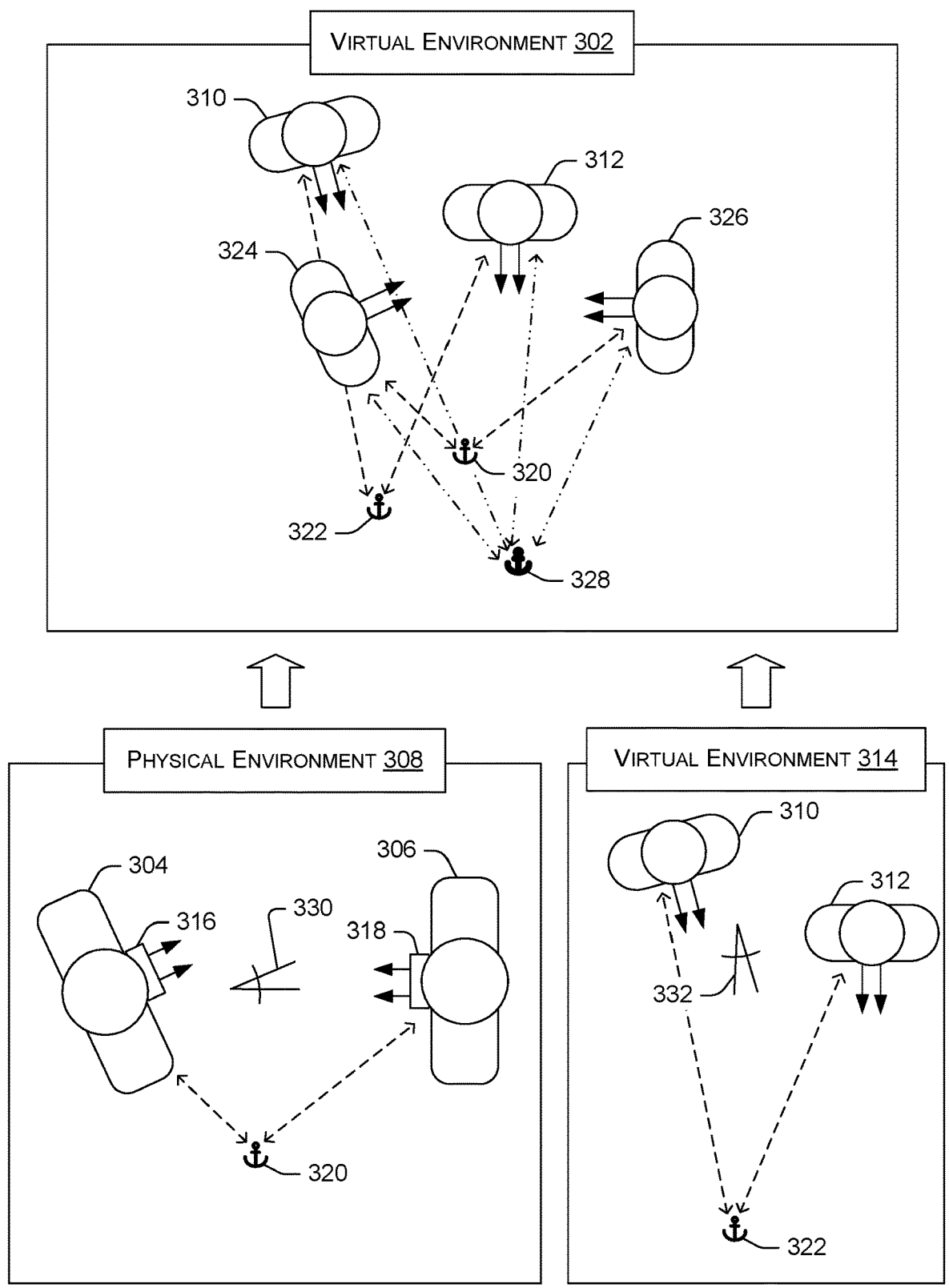
FIG. 3 illustrates an example of representing users and representations from various environments within a common virtual environment.

FIG. 3 illustrates an example of representing users and representations from various environments within a common virtual environment 302. The common virtual environment 302 (sometimes referred to as "the virtual environment 302") may allow users and/or representation from various physical and/or virtual environments to communicate. In this example, composite spatial data may be created and used to maintaining spatial alignment of users 304 and 306 in a physical environment 308 and spatial alignment of representations 310 and 312 in a virtual environment 314. By maintaining spatial alignment of users and/or representations of users, the techniques may assist in establishing shared presence within the common virtual environment 302 (e.g., creating an experience where users feel present with each other).

In this example, a device 316 associated with the user 304 communicates with a device 318 associated with the user 306 to establish a reference frame 320 (e.g., an anchor point in the physical environment 308). Here, the reference frame 320 comprises a shared reference frame that is used by both devices 316 and 318. The devices 316 and 318 may share the reference frame 320, since the users 304 and 306 are located in a same physical environment 308, such as the same room, house, yard, etc. Although in other examples, the devices 316 and 318 may use different reference frames. Although not illustrated in FIG. 3, the reference frame 320 may be associated with a coordinate system (e.g., may be an origin of the coordinate system). This may allow an object (e.g., the users 304 and 306) to be described relative to the reference frame 320.

The reference frame 320 may be used to generate spatial data for the user 304 and/or the user 306. For instance, the device 316 may determine a position of the user 304 relative to the reference frame 320 and an orientation of the user 304 relative to the reference frame 320 (e.g., an angle relative to an origin and/or axis for a coordinate system associated with the reference frame 320). To illustrate, this may include determining X, Y, Z values indicating a position of the user 304 relative to the reference frame 320 and/or Xr, Yr, Zr values indicating rotation of the user 304 relative to the reference frame 320. In examples, the X, Y, Z and/or Xr, Yr, Zr values may be used to find a distance between the user 304 and the reference frame 320, or any other information. Such information about an alignment (e.g., positioning) of the user 304 relative to the reference frame 320 may be stored as spatial data for the user 304 (e.g., the spatial data for the user 304 may include the X, Y, Z and/or Xr, Yr, Zr values). In some examples, the spatial data is relative to a specific feature of the user 304, such as a specific body part. For instance, the spatial data for the user 304 may indicate that eyes of the user 304 are located at a specific X, Y, Z coordinate relative to the reference frame 320 and are looking in a direction that establishes a 240-degree angle with the origin and/or axis for the coordinate system associated with the reference frame 320. The lines from the device 316 in FIG. 3 indicate the direction in which the eyes of the user 304 are looking. Although illustrated as looking perpendicular to a body of the user 304, the eyes may be looking in any direction. Similar processing may be performed to generate spatial data for the user 306.

The representation 310 and the representation 312 within the virtual environment 314 are also associated with a reference frame 322. Here, the reference frame 322 comprises a virtual point in the virtual environment 314, such as an object, corner of a room, etc. that is part of the virtual environment 314. Although not illustrated in FIG. 3, each of the representations 310 and 312 may be associated with a user, other than the users 304 and 306. In the example of FIG. 3, the representation 310 and the representation 312 share the reference frame 322. In other examples, different reference frames may be used.

The reference frame 322 may be used to generate spatial data for the representation 310 and/or the representation 312. For instance, spatial data for the representation 310 may indicate a position of the representation 310 relative to the reference frame 322 and/or an orientation of the representation 310 relative to the reference frame 322 (e.g., an angle relative to an origin and/or axis for a coordinate system associated with the reference frame 322). To illustrate, the spatial data may indicate X, Y, Z coordinate values of the representation 310 relative to the reference frame 322 and/or Xr, Yr, Zr coordinate values indicating rotation of the representation 310 relative to the reference frame 322. As similarly noted above, the spatial data for the representation 310 may be specific to a feature of the representation 310, such as eyes of the representation 310. The lines from representation 310 in FIG. 3 indicate the direction in which the eyes of the representation 310 are looking. Although illustrated as looking perpendicular to a body of the representation 310, the eyes may be looking in any direction. Similar processing may be performed to generate spatial data for the representation 312.

In the example of FIG. 3, the users 304 and 306 in the physical environment 308 and the representations 310 and 312 in the virtual environment 314 are each represented within the common virtual environment 302 to communicate. In particular, the user 304 is represented within the virtual environment 302 with a representation 324 and the user 306 is represented within the virtual environment 302 with a representation 326. Meanwhile, the representation 310 and the representation 312 are provided within the virtual environment 302.

To maintain the spatial alignment of the users 304 and 306 within the physical environment 308 and the spatial alignment of the representations 310 and 312 within the virtual environment, composite spatial data may be generated. The composite spatial data may include the spatial data for the user 304, the spatial data for the user 306, the spatial data for the representation 310, and/or the spatial data for the representation 312. Additionally, or alternatively, the composite spatial data may indicate a reference frame 328 that is common for the representations 310, 312, 324, and 326 within the virtual environment 302. The reference frame 328 may include a point in the virtual environment 302, such as an object, corner in a room, etc. The composite spatial data may indicate a position of the representations 310, 312, 324, and 326 relative to the reference frame 328. For example, the composite spatial data may indicate a position of the representation 310 relative to the reference frame 328 and/or an orientation of the representation 310 relative to the reference frame 328 (e.g., an angle relative to an origin and/or axis for a coordinate system associated with the reference frame 328, X, Y, Z and/or Xr, Yr, Zr coordinate values of the representation 310 relative to the reference frame 328, etc.). Similar data may be stored in the composite spatial data for each of the other representations 312, 324, and 326. Further, the composite spatial data may indicate a position and/or orientation of reference frames relative to each other (e.g., a position and/or orientation of the reference frame 320 relative to the reference frame 328, and a position and/or orientation of the reference frame 322 relative to the reference frame 328).

The composite spatial data may be used to position the representations 310, 312, 324, and 326 within the virtual environment. For example, the positioning and/or orientation of the representations 324 and 326 in the virtual environment 302 may be maintained from the positioning and/or orientation of the users 304 and 306 in the physical environment 308. Further, the positioning and/or orientation of the representations 310 and 312 in the virtual environment 302 may be maintained from the positioning and/or orientation of the representations 310 and 312 in the virtual environment 314. In some examples, the positioning and/or orientation is maintained without a scaling factor (e.g., if the users 304 and 306 are ten feet apart in the physical environment 308, the representations 324 and 326 may be a distance apart in the virtual environment 302 that corresponds to ten feet). In other examples, a scaling factor is used (e.g., positioning of all representations is scaled up or down by a factor of five). As illustrated in FIG. 3, an angle 330 between the users 304 and 306 in the physical environment 308 is maintained for the representations 324 and 326 in the virtual environment 302. As also illustrated, an angle 332 between the representations 310 and 312 in the virtual environment 314 is maintained in the virtual environment 302.

Although the example of FIG. 3 discusses nesting one virtual environment into another (e.g., nesting the virtual environment 314 into the virtual environment 302), any number of virtual environments may be nested.

The techniques discussed herein may be implemented in a variety of contexts. In one example, a user associated with the representation 310 may be interacting with a user associated with the representation 312 in the virtual environment 314 (e.g., playing a game, exploring a space, communicating, etc.). Such users may wish to join a communication session with the users 304 and 306, while still maintaining the interaction in the virtual environment 314. As such, the virtual environment 302 may be implemented to facilitate a communication session with all the users (e.g., the users associated with the virtual environment 314 and the users 304 and 306). The users associated with the virtual environment 314 may switch between virtual environments 302 and 314, interact in the virtual environments 302 and 314 simultaneously, etc. In another example, the users associated with the virtual environment 314 may wish to have a side conversation, and the virtual environment 314 is implemented to facilitate such conversation. In yet another example, the virtual environment 302 (or the virtual environment 314) may be a specific type of virtual environment that enables a specific type of interaction (e.g., a secure virtual environment that enables users to communicate more securely than other types of virtual environments, etc.). In a further example, the virtual environment 302 (or the virtual environment 314) may be a Virtual Reality (VR) environment and the virtual environment 314 (or the virtual environment 302) may be another type of environment, such as an Augmented Reality (AR) environment.

Figure 4:
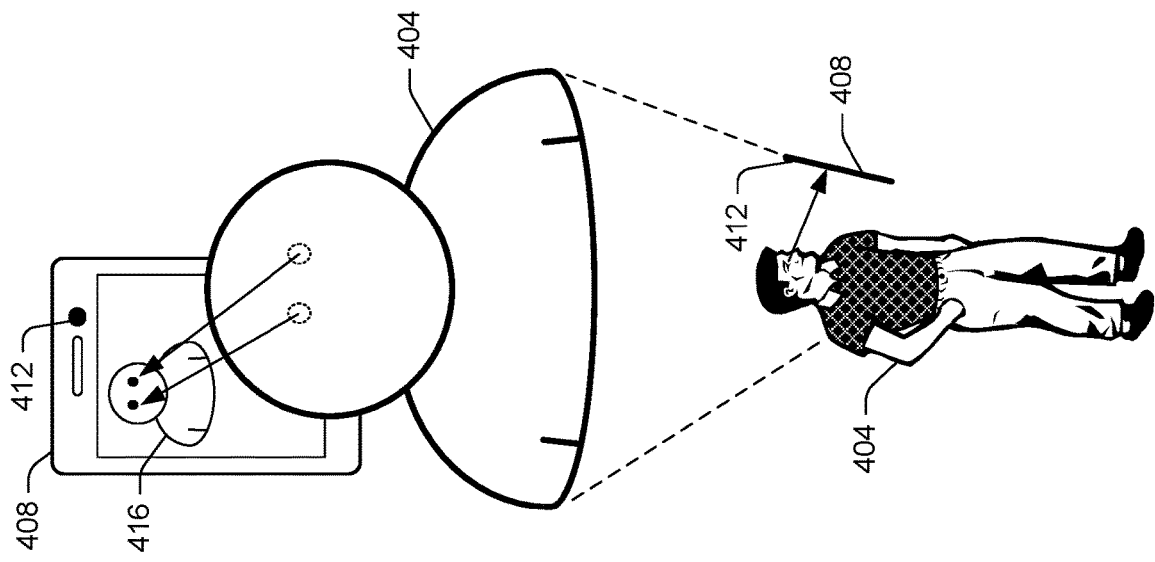
FIG. 4 illustrates an example of outputting a first representation of a first user to a second user in a manner that is aligned to input for the first user.
Figure 4:
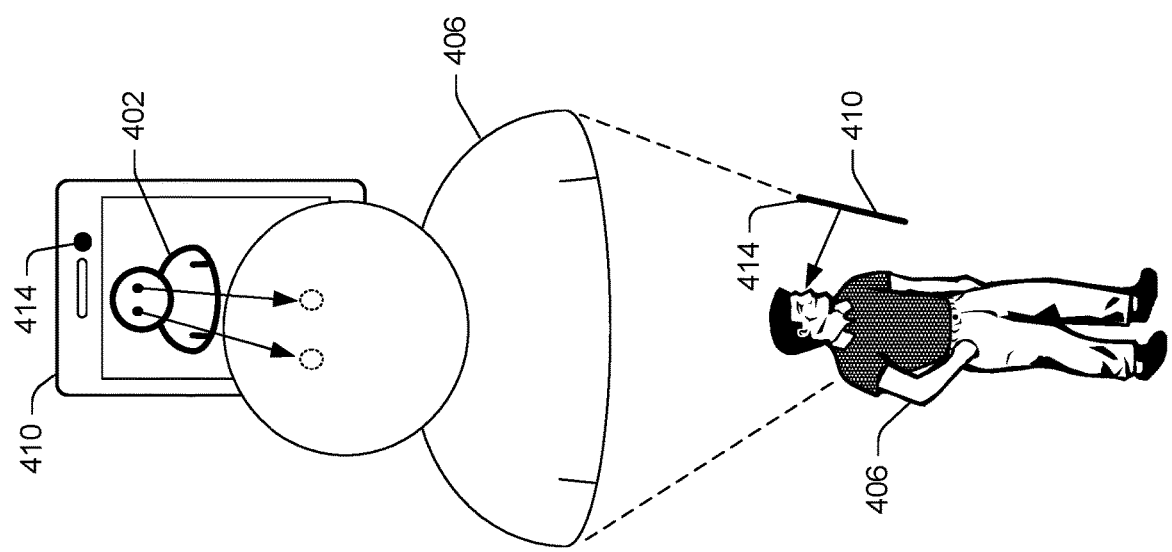

FIG. 4 illustrates an example of outputting a first representation 402 of a first user 404 to a second user 406 in a manner that is aligned to input for the first user 404. In this example, the first user 404 uses a first device 408 to communicate with the second user 406 that uses a second device 410. This communication may include a videotelephony session (e.g., videoconferencing), a VR session, an AR session, or any other communication session. Here, the first device 408 includes a sensor 412 (e.g., a video camera, a still camera, a depth sensor, etc.) to capture data of the first user 404, such as images, depth data, etc. Further, the second device 410 includes a sensor 414 to capture data of the second user 406. Although the devices 408 and 410 are illustrated as mobile devices, such as mobile phones or tablets, the devices 408 and 410 may be any type of device.

In this example, data from the sensor 412 may be processed to provide the first representation 402 of the first user 404 and data from the sensor 414 may be processed to provide a second representation 416 of the second user 406. For instance, the first device 408 may analyze data from the sensor 412 to identify a direction in which eyes of the first user 404 are looking. To do so, the first device 408 may determine, through processing images and/or depth data, (i) a location and/or orientation of the first device 408 relative to the first user 404 and/or relative to a reference frame, (ii) a location and/or orientation of the first user 404 relative to the first device 408 and/or relative to a reference frame, (iii) a location and/or orientation of eyes of the first user 404 relative to the first device 408 and/or relative to a reference frame, (iv) a location and/or orientation of any other body part of the first user 404 (e.g., ears, nose, hands, feet, etc.) relative to the first device 408 and/or relative to a reference frame, etc. To illustrate, the first device 408 may obtain facial data about a face of the first user 404 and analyze the facial data to identify a location of eyes of the first user 404 on the first user's 404 face, a distance between the eyes of the first user 404, etc. In some instances, the first device 408 may identify a location of a pupil of an eye of the first user 404. Based on such location, and knowing a general shape of the eye through image or depth data processing (or knowing a shape of an average user's eye), the first device 408 may estimate a direction that the pupil of the eye is looking. In some examples, the first device 408 may estimate the direction to be a line extending out of a center of the pupil of the eye.

The first device 408 may correlate a direction in which eyes of the first user 404 are looking (e.g., a direction in which a pupil is looking) to a location on a display screen of the first device 408. In some examples, the first device 408 may project a line out of a pupil of an eye of the first user 404 onto the first device 408. The first device 408 may also reference information about the first device 408, such as a screen size, a size of the first device 408, a location of the sensor 412 relative to a screen, etc. Based such information, the first device 408 may determine a group of pixels on a screen of the first device 408 that the first user 404 is looking at. The group of pixels may be correlated to content that is being displayed via the screen of the first device 408. In this example, the first user 404 is looking into eyes of the second representation 416 of the second user 406 (e.g., looking at a top, left corner of a display screen of the first device 408, where the eyes of the second representation 416 are displayed).

The first device 408 may send data about the direction in which the first user 404 is looking to the second device 410, so that the first representation 402 for the first user 404 may be displayed in a manner that is aligned to the first user 404. As illustrated in FIG. 4, the second device 410 displays the first representation 402 of the first user 404 with eyes that are looking into the eyes of the second user 406. To do so, the second device 410 may analyze data from the sensor 414 (e.g., analyze images, depth data, etc.) to determine (i) a location and/or orientation of the second device 410 relative to the second user 406 and/or relative to a reference frame, (ii) a location and/or orientation of the second user 406 relative to the second device 410 and/or relative to a reference frame, (iii) a location and/or orientation of eyes of the second user 406 relative to the second device 410 and/or relative to a reference frame, (iv) a location and/or orientation of any other body part of the second user 406 (e.g., ears, nose, hands, feet, etc.) relative to the second device 410 and/or relative to a reference frame etc. In particular, the second device 410 may obtain facial data about a face of the second user 406 and analyze the facial data to identify a location of eyes of the second user 406 on the second user's 406 face, a distance between the eyes of the second user 406, etc. The second device 410 may then generate the first representation 402 with eyes looking into the eyes of the second user 406.

In a similar manner, the second representation 416 of the second user 406 may be output to the first user 404. By performing such techniques, the first representation 402 may be aligned to the first user 404 and the second representation 416 may be aligned to the second user 406. This may avoid a user from having to look directly into a sensor (e.g., camera) to appear as looking into the eyes of another user, for example. As illustrated in FIG. 3, the first representation 402 is looking directly into the eyes of the second user 406, since the first user 404 is looking directly into the eyes of the second representation 416.

In some examples, a representation of a user may include a synthetic image and/or an actual image of the user. In one example, the first representation 402 for the first user 404 may include an image of the first user 404 (e.g., real-time image) with a synthetic image of a face of the first user 404 overlaid on the real-time image of the first user 404 (e.g., computer-generated face overlaid on a face of the first user 404). The synthetic image may include a face of the first user with the eyes of the first user 404 (and other facial features) looking in a direction in which the first user 404 is looking relative to the second representation 416 (and the corresponding second user 406). The synthetic image of the face of the first user 404 may include pixel values from images of the first user 404 (e.g., to appear as though the first user 404 is actually looking in that direction) or other pixel values for an avatar, cartoon character, animated emoji, etc. In another example, the first representation 402 may include a fully synthetic representation (e.g., an avatar, cartoon character, animated emoji, etc.).

Although the example of FIG. 4 is discussed in the context of the first device 408 and the second device 410 performing specific operations, the operations may be performed by any number of devices, such as any of the first device 408, the second device 410, a service provider, etc.

Figure 5:
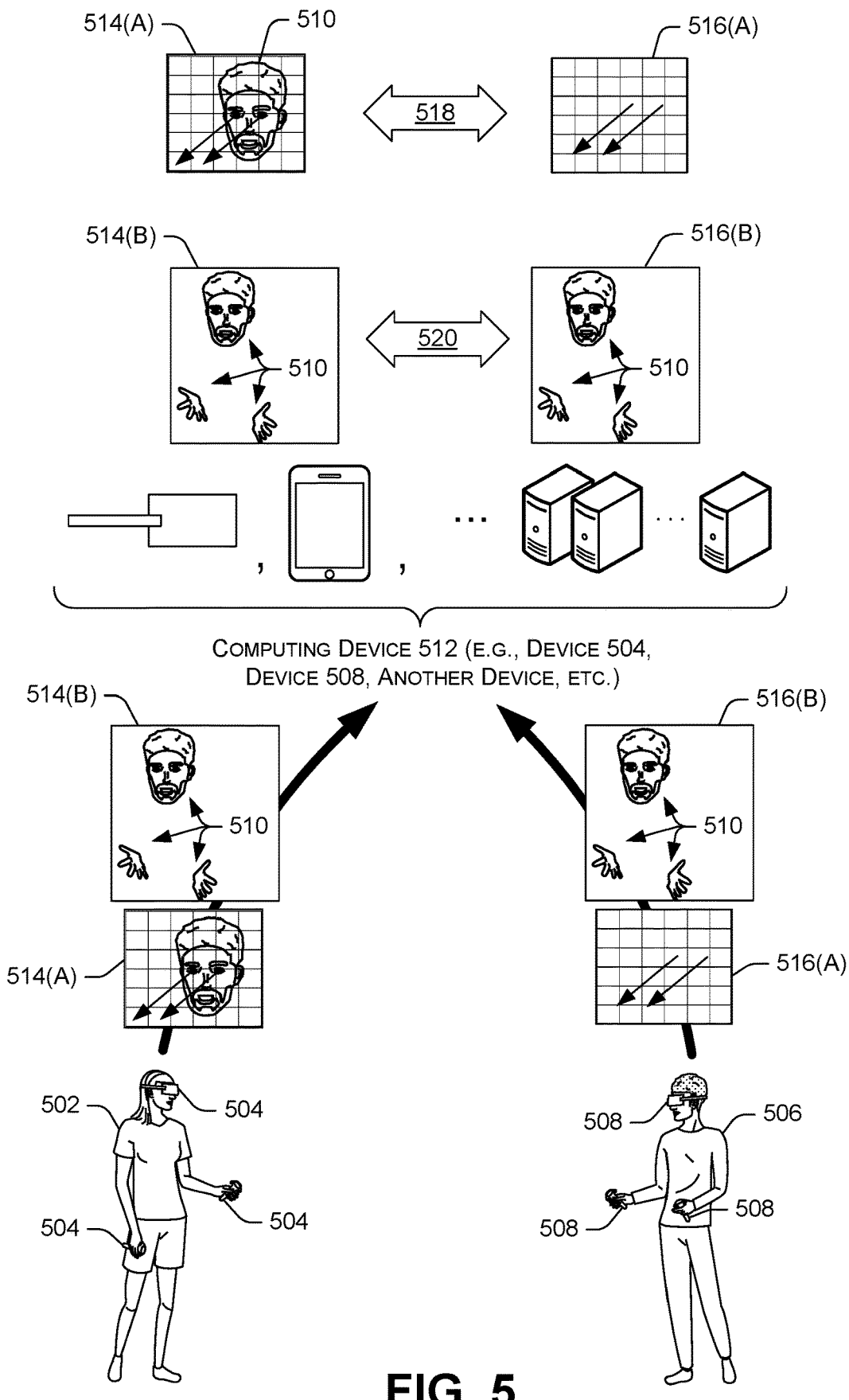
FIG. 5 illustrates an example of evaluating representations and/or users to ensure that a communication session has shared presence.

FIG. 5 illustrates an example of evaluating representations and/or users to ensure that a communication session has established shared presence. In this example, a first user 502 uses a first device 504 to interact with a second user 506 that uses a second device 508. The first user 502 and the second user 506 are part of a communication session that operates to provide shared presence. Here, the first user 502 may be associated with a first representation (not illustrated in FIG. 5 for ease of discussion) and the second user 506 may be associated with a second representation 510. A computing device 512 (e.g., the device 504, the device 508, another device, a service provider, etc.) may evaluate the second representation 510 of the second user 506 to determine if a location or direction of output of the second representation 510 as perceived by first user 502 matches a location or direction of output of the second representation 510 as perceived by the second user 506. For ease of discussion, the following example will discuss an evaluation of a direction in which an eye of the second representation 510 is looking. However, a similar process may be performed to evaluate the first representation of the first user 502. Further, similar processing may be performed for other features of a user's body (e.g., other body parts).

To evaluate the second representation 510, the first device 504 may identify a first direction in which an eye of the second representation 510 is looking in a coordinate system as displayed by the first device 504. The first direction may be a direction that the first user 502 perceives (when looking through the first device 504) the second representation 510 looking (e.g., relative to the first user 502) and/or a direction that the second representation 510 is looking relative to a reference frame. To illustrate, the first user 502 may perceive that the second representation 510 is looking into eyes of the first user 502. The first device 504 may generate first data 514 indicating the first direction. The first data 514 may include a line or vector 514(A) representing the first direction (e.g., a line or vector positioned in a coordinate system), an image 514(B) of a view of the second representation 510 from a perspective of the first user 502 (e.g., an image of what the first user 502 sees through the first device 504), etc. When the evaluation process is performed by another device (e.g., the device 508, a service provider, etc.), the first device 504 may send the first data 514 to the other device.

The second device 508 may identify a second direction in which the eye of the second representation 510 is looking in the coordinate system. The second direction 516 may be a direction that the second user 506 is looking in the coordinate system through the second device 508 relative to the first representation of the first user 502, a reference frame, etc. To illustrate, the second user 506 may be looking into eyes of the first representation of the first user 502 that are displayed through the second device 508. The second device 508 may generate second data 516 indicating the second direction. The second data 516 may include a line or vector 516(A) representing the second direction (e.g., a line or vector positioned in a coordinate system), an image 516(B) of an estimated view of the second representation 510 from a perspective of the first representation of the first user 502 (e.g., an image generated by the second device 508 that the second device 508 estimates would be seen from a perspective of the first representation of the first user 502), etc. In other words, the image 516(B) may represent a view that the second device 508 estimates would be seen by the first user 502 due to how the first representation of the first user 502 is currently being presented through the second device 508. To illustrate, if the second device 508 presents the first representation of the first user 502 as looking into the eyes of the second user 506, and the second user 506 is looking back into the eyes of the first representation, then the second device 508 would generate an image of the second representation 510 (from the perspective of the first representation) looking directly out of the image. In any event, when the evaluation process is performed by another device (e.g., the device 504, a service provider, etc.), the second device 508 may send the second data 516 to the other device.

The computing device 512 may evaluate the first direction in which the eye of the second representation 510 is looking in the coordinate system as displayed by the first device 504 and the second direction in which the eye of the second representation 510 is looking in the coordinate system as provided by the second device 508. In one example, at 518, the computing device 512 may compare the line or vector line represented in the first data 514(A) to the line or vector represented in the second data 516(A). If the lines or vectors match (e.g., the two vectors are located within a threshold proximity to each other, have the same angle within a threshold number of degrees, and/or have the same magnitude), then the communication session has shared presence (or is able to establish shared presence) (e.g., the eyes of the users 502 and 506 are accurately depicted). Here, the communication session may continue with shared presence, establish shared presence, etc. Alternatively, if the lines or vectors do not match, then the communication session has lost shared presence (or is unable able to establish shared presence). In another example, at 520, the image represented by the first data 514(B) may be compared to the image represented by the second data 516(B). If the images match (e.g., a direction in which the eyes of the second representation 510 are looking in the image of the first data 514(B) is within a threshold amount of similarity to a direction in which the eyes of the second representation 510 are looking in the image of the second data 516(B), the pixel values are the same by more than a threshold amount, etc.), then the communication session has shared presence (or is able to establish shared presence). Alternatively, if the images do not match, then the communication session has lost shared presence (or is unable able to establish shared presence).

If the communication session has lost shared presence (or is unable able to establish shared presence), a variety of operations may be performed. For example, the first device 504 and/or the second device 508 may be restated, an eye tracking sensor, depth sensor, or other device that may be experiencing an error in providing eye data may be restarted, the communication session may be switched to a type of communication session that does not share or align eye data (e.g., displaying a more generic representation of a user that does not align eyes of the representation, displaying just a video of the users, etc.).

In some examples, the evaluation process may occur during calibration. In one example, while joining a communication session, the user 502 and the user 506 may be asked to look at each other in the eyes (e.g., one user to look at the eyes of the representation of the other user), and confirm eye contact through voice input, a button on a controller, etc. when the user 502 (or the user 506) perceives the other user's representation looking at the user 502. In another example, the user 502 and the user 506 may be asked to look at each other in the eyes, and the device 504 and/or the device 508 may confirm that eye contact is made when data from an eye tracking sensor indicates that the user 502 (or the user 506) is looking into the eyes of the other user's representation.

Although the example of FIG. 5 is discussed in the context of evaluating eyes, other features (e.g., body parts) may be evaluated. For example, the techniques may evaluate a direction in which sound from a mouth of a representation is perceived, a location of touch on a representation that is perceived, etc., as discussed in further detail below. Further, although the example of FIG. 5 is discussed in the context of evaluating a representation of a user, a similar process may be performed to evaluate a direction in which an eye of a user is looking in a coordinate system, as discussed in further detail below.

Figure 6:
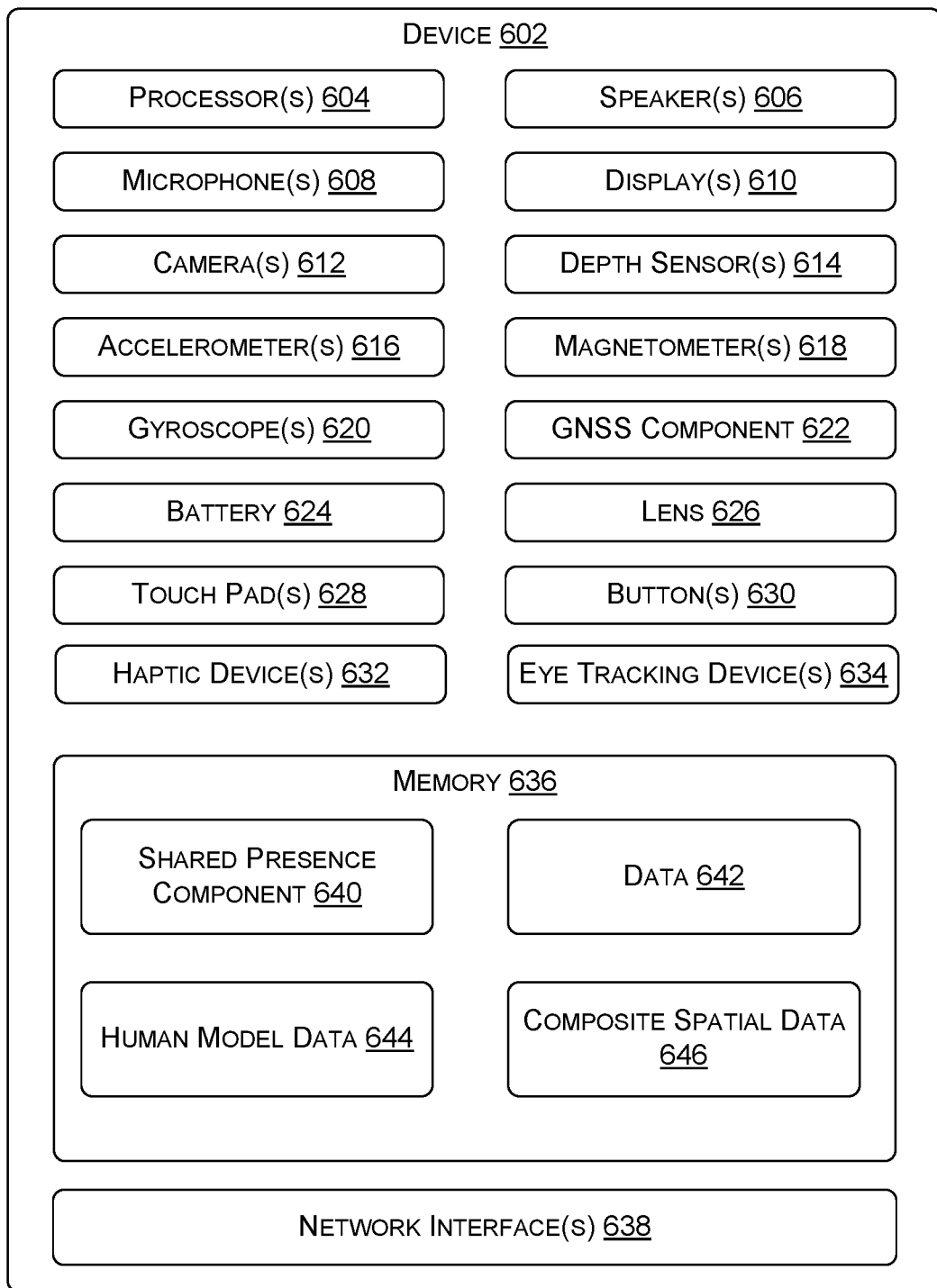
FIG. 6 illustrates an example device that may perform the techniques discussed herein.

FIG. 6 illustrates an example device 602 that may perform the techniques discussed herein. For example, the device 602 may represent any of the devices 108, 110, 112, 210, 316, 318, 408, 410, 504, 508, etc.

The device 602 may comprise a variety of types computing devices that are configured to perform an operation(s). For example, the devices 602 may be implemented as a laptop computer, a desktop computer, a smart phone, an electronic reader device, a mobile handset, a personal digital assistant (PDA), a portable navigation device, a portable gaming device, a VR device (e.g., VR headset, such as the HTC® Vive, Microsoft® Hololens®, Oculus® Rift, etc.), a tablet computer, a wearable computer (e.g., a watch, an optical head-mounted display (OHMD), etc.), a portable media player, a television, a set-top box, a computer system in a car, an appliance, a camera, a robot, a hologram system, a security system, a home-based computer system (e.g., intercom system, home media system, etc.), a projector, an automated teller machine (ATM), and so on.

The device 602 may include a processor(s) 604, a speaker(s) 606, a microphone(s) 608, a display(s) 610, a camera(s) 612, a depth sensor(s) 614, an accelerometer(s) 616, a magnetometer(s) 618, a gyroscope(s) 620, a Global Navigation Satellite System (GNSS) component 622 (e.g., GNSS receiver, such as a GPS receiver), a battery 624, a lens(es) 626, a touch pad(s) 628, a button(s) 630, a haptic device(s) 632, an eye tracking device(s) 634, memory 636, and/or a network interface(s) 638. Although not illustrated in FIG. 6, in some examples the device 602 also includes a power cord, straps or other devices for securing the device 602 to a user (e.g., head straps, in the case of a VR headset), an olfactory sensor (e.g., to detect smell), a projector(s), etc.

The one or more processors 604 may include a central processing unit (CPU), a graphics processing unit (GPU), a microprocessor, a digital signal processor, and so on. The speaker(s) 606 may output audio. In some examples, multiple speakers 606 are implemented. To illustrate, the device 602 may include a speaker 606 that is configured to be placed over each ear of a user. Here, the speakers 606 may be adjustable, so that they may be positioned as the user desires. The microphone(s) 608 may receive sound and generate an audio signal. In some examples, the microphone(s) 608 (or processing of an audio signal from the microphone(s) 608) may identify a direction in which sound is received (e.g., relative to the device 602).

The display(s) 610 may include a touch screen, a Liquid-crystal Display (LCD), a Light-emitting Diode (LED) display, an organic LED display, a plasma display, an electronic paper display, or any other type of technology. In some examples, the display(s) 610 is aligned with the lens 626. To illustrate, the display(s) 610 may be aligned with an axis through the lens 626. The lens 626 may be formed of plastic, glass, etc. The lens 626 may be adjustable. To illustrate, a user may move the lens 626 closer or farther from the display(s) 610 to make an image appear closer/farther and/or bring an image into focus. In another illustration, a user may adjust the lenses 626 to fit the lenses 626 to a distance between the user's eyes (e.g., Interpupillary Distance (IPD)). Further, in some examples, the lenses 626 may include a sensor (e.g., potentiometer) used to measure IPD distance. In some examples, such data regarding the IPD may be used to generate body data and/or sent to another device, so that a representation of a user that is using the device 602 may be rendered accurately.

The camera(s) 612 may capture an image(s). The image may comprise a still image, a video, etc. The camera(s) 612 may include a front facing camera, a rear facing camera, etc. In some examples, the device 602 includes one or more cameras to capture data regarding a user's surrounding and/or one or more cameras to capture images of the user. For example, the device 602 may be implemented as a VR headset that includes an outward facing camera to capture images of a physical environment in which a user is located and an inward facing camera to capture images of the user's face or other body parts.

The depth sensor(s) 614 (also referred to as a range sensor) may implement a variety of techniques to generate depth data indicating distance to points in a surrounding. In some examples, the device 602 includes a depth sensor 614 that faces a user's environment (e.g., to obtain depth data about the user's physical environment) and a depth sensor 614 that faces a user (e.g., to obtain facial data about the user's face, hand data about the user's hand, other data about other parts of the user's body, etc.). In one example, the depth sensor(s) 614 may include a time-of-fight camera ((ToF) camera) that measures the time-of-flight of a light signal between the ToF camera and a target in an environment. In another example, the depth sensor(s) 614 may include a structured-light 3D scanner (e.g., an infrared emitter and infrared camera) to implement a structured-light technique that projects a known pattern (e.g., structured light) onto a surface and captures image(s). In yet other examples, the depth sensor(s) 614 may implement other techniques, such as sheet of light triangulation, stereo triangulation, interferometry, and so on. As non-limiting examples, the depth sensor(s) 614 may implement techniques and/or components used by the RealSense® camera from Intel®, the Hololens® from Microsoft®, the TrueDepth® camera from Apple®, the Tango® system from Google®, the Kinect® system from Microsoft®, etc. In some examples, the depth sensor(s) 614 includes the camera(s) 612 to capture an image. The depth sensor(s) 614 may generate depth data, such as a range image, depth map, etc. The depth data may indicate one or more distances to one or more points represented in the depth data, respectively. In some examples, depth data may be used to identify distances to points in an environment, identify an object or surface in the environment, and/or position and/or maintain a representation of user or other content in relation to the object or the surface as the device 602 moves within the environment (e.g., in an AR or VR implementation).

The accelerometer(s) 616 may determine acceleration of the device 602. The magnetometer(s) 618 may determine a magnetism of the device 602. Further, the gyroscope(s) 620 may determine an orientation and/or an angular velocity of the device 602. In some instances, the data from the accelerometer(s) 616, magnetometer(s) 618, and/or gyroscope(s)

620 may be used to determine a location of the device 602 and/or track the location of the device 602 over time. To illustrate, the data from the accelerometer(s) 616, magnetometer(s) 618, and/or gyroscope(s) 620 may be used to determine how far the device 602 has traveled from an initially known location (e.g., based on GNSS data or other data) and/or determine a direction of travel of the device 602.

The GNSS component 622 may determine a geographical location of the device 602. For example, the GNSS component 622 may receive information from a GNSS (e.g., GPS) and calculate a geographical location of the device 602 based on the information. The touch pad(s) 628 and/or the button(s) 630 may be configured to receive input (e.g., touch input, etc.). Further, in some examples, the touch pad(s) 628 and/or the button(s) 630 may provide output, such as haptic feedback.

The haptic device(s) 632 may comprise a tactile sensor, a haptic feedback device, a haptic stylus or tool, a haptic suit—full-body, glove, torso, etc., a wearable device, and so on. In some examples, the haptic device(s) 632 may recreate a sense of touch by applying force, motion, and/or vibration. The haptic device(s) 632 may regulate an amount of force, motion, and/or vibration that is applied (e.g., to a user), provide force, motion, and/or vibration at a particular location (e.g., on a haptic suit), etc. Moreover, in some examples, the haptic device(s) 632 may detect touch or other physical interaction. The haptic device(s) 632 may measure an amount of force received (e.g., to a user), determine a location of the force (e.g., the input), etc.

The eye tracking device(s) 634 may detect and/or track eye movements and/or head movements of a user. In some examples, the eye tracking device(s) 634 detects and/or tracks a location of a pupil of the eye. The eye tracking device(s) 634 may generate eye tracking data.

The memory 636 (as well as all other memory described herein) may include one or a combination of computer readable media. Computer readable media includes volatile and non-volatile, removable and non-removable media implemented in any method or technology for storage of information, such as computer readable instructions, data structures, program modules, or other data. Computer readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer readable media does not include communication media, such as modulated data signals and carrier waves. As such, computer readable media is non-transitory media.

The network interface(s) 638 may be configured to communicate in a wireless and/or wired manner with one or more devices over a network.

In some examples, one or more of the components 604-638 may be implemented as part of a controller that is communicatively coupled to the rest of the components. Here, the device 602 may be implemented as two devices that facilitate the functionality described herein. For example, the controller may include its own (or share) the processor(s) 604, accelerometer(s) 616, magnetometer(s) 618, gyroscope(s) 620, touch pad(s) 628, and/or button(s) 630, haptic device(s) 632, memory 636, network interface(s) 638, etc.

In some examples, the device 602 may be configured to receive user input, such as gesture input (e.g., through the camera(s) 612), touch input, audio or speech input, and so on. Further, the device 602 may be configured to output content, such as audio, images, video, and so on.

As illustrated, the memory 636 may include a shared presence component 640. The shared presence component 640 may represent software and/or hardware. While one component is illustrated as an example for performing various functionality, its functionality and/or similar functionality could be arranged differently (e.g., broken into a larger number of components, etc.). In some cases of implementing hardware, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

The shared presence component 640 may generally perform operations to establish and/or evaluate shared presence for a communication session between users. In one example, the shared presence component 640 may receive data 642 from the microphone(s) 608, the display(s) 610, the camera(s) 612, the depth sensor(s) 614, the accelerometer(s) 616, the magnetometer(s) 618, the gyroscope(s) 620, the Global Navigation Satellite System (GNSS) component 622, the touch pad(s) 628, the button(s) 630, the haptic device(s) 632, and/or the eye tracking device(s) 634. The shared presence component 640 may analyze the data 642 and perform a variety of operations based on the analysis. In some examples, the analysis includes computer vision processing and/or image processing. To illustrate, based on the analysis of the data 642, the shared presence component 640 may identify a reference frame, a position of a user or device (e.g., the device 602) to the reference frame and/or to another user or device, identify objects or surfaces in an environment in which the device 602 is located, identify a location, velocity, orientation (e.g., pose, angle, etc.), etc. of a user and/or the device 602, etc., identify a location, velocity, orientation, etc. of a feature of a user (e.g., body part), identify a direction in which an eye of a user or a representation of a user is looking, and/or perform a variety of other operations. In some examples, the shared presence component 640 may communicate with another device to negotiate a shared reference frame, such as in the case when two devices are in the same physical or virtual environment. A reference frame may be maintained during a communication session and/or updated periodically or when an event occurs, such as the device 602 changing locations (e.g., moving from one room to the next), the device 602 moving more than a threshold distance from an existing reference frame, etc.

In some examples, the data 642 includes body data, such as facial data about a user's face, hand data about a user's hand, data about another body part, etc. For example, the body data may be captured by the camera(s) 612, the depth sensor(s) 614, the eye tracking device(s) 634, and/or any other component of the device 602. In some instances, the body data may be represented in a format, such as MPEG-4 Face and Body Animation data. The device 602 may capture body data for a user that is using the device 602 and send the body data to another device, so that the other device may render a representation of the user. In some examples, the body data indicates a location, size, shape, orientation, etc. of a body part of a user (e.g., a size of the user's hands, an IPD for eyes of the user, a location of a mouth, ears, nose, etc. for a user, and so on). In one illustration, the body data may indicate a direction in which an eye of a user is looking (e.g., a direction a pupil is looking).

In some examples, the shared presence component 640 may generate human model data 644 describing a human model (sometimes referred to as "model"). For example, based on the data 642 (e.g., body data, etc.), the shared presence component 640 may generate a human model that represents the user. The human model may include features that represent the user (e.g., hands that are sized to the size of the user's hands, an IPD that matches a user's IPD, a mouth, ears, nose, etc. located where a user's mouth ears, nose, etc. are located, and so on). In some instances, a human model may be specific to a user. In other instances, a variety of data is collected overtime from multiple users to create a generic human model that represents multiple users.

In some examples, the shared presence component 640 may align representations of users within a coordinate system while maintaining spatial alignment of the users in a physical environment and/or spatial alignment of the representations in another coordinate system. To do so, the shared presence component 640 may generate spatial data for a user and/or representation (e.g., based on the analysis of the data 642), generate composite spatial data 646, and/or use the spatial data and/or composite spatial data 646 to position a representation of a user in a coordinate system. In some examples, the shared presence component 640 may generate (e.g., render) a representation of a user based on the data 642 (e.g., body data), the human model data 644, the composite spatial data 646, etc.

A coordinate system may be a standardized set of measurements or coordinates that are fixed to a reference frame. A coordinate system may describe a geometric state of an object (e.g., in relation to the reference frame). A coordinate system may represent a virtual environment, a number line, a Cartesian coordinate system, a polar coordinate system, etc.

In some instances, the composite spatial data 646 is implemented in the context of a state machine. For example, as each user joins a communication session, the user may be associated with a state machine that indicates that the user has joined (or lost connection), spatial data for the user and/or a representation for the user, whether or not body data for the user is detected and/or being exchanged between devices, and so on. The composite spatial data 646 may represent the state machines for the various users that are part of the communication session. In some examples, composite spatial data 646 may include spatial data for each user or device that is part of a communication session.

In some examples, the shared presence component 640 may evaluate shared presence. To illustrate, a direction in which a first user perceives a representation for a second user looking, as displayed by a device associated with the first user, may be compared to a direction in which a device for the second user indicates that the representation for the second user is looking. If the directions are the same within a threshold amount, then the communication session has shared presence. While if the directions are not the same within a threshold amount, then the communication session has lost shared presence.

Figure 7:
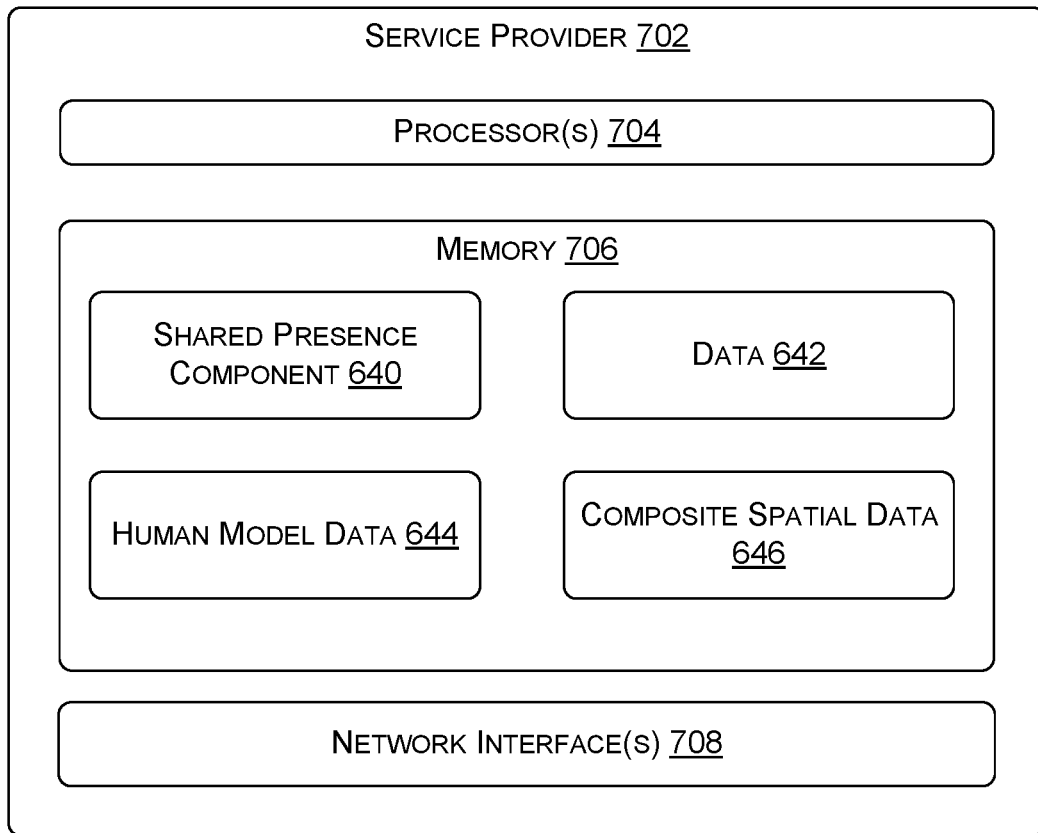
FIG. 7 illustrates an example service provider that may perform the techniques discussed herein.

FIG. 7 illustrates an example service provider 702 that may perform the techniques discussed herein. For example, the service provider 702 may represent the service provider 130, the computing device 512, etc.

The service provider 702 may be implemented as one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, network resources, storage resources, and the like, that operate remotely to devices. To illustrate, the service provider 702 may implement a cloud computing platform/infrastructure for building, deploying, and/or managing applications and/or services.

As illustrated, the service provider 702 includes one or more processors 704, memory 706, and one or more network interfaces 708. The one or more processors 704 may include a central processing unit (CPU), a graphics processing unit (GPU), a microprocessor, a digital signal processor, and so on. The one or more network interfaces 708 may communicate with other devices in a wireless or wired manner.

The memory 706 (as well as all other memory described herein) may include one or a combination of computer readable media. Computer readable media includes volatile and non-volatile, removable and non-removable media implemented in any method or technology for storage of information, such as computer readable instructions, data structures, program modules, or other data. Computer readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer readable media does not include communication media, such as modulated data signals and carrier waves. As such, computer readable media is non-transitory media.

In some examples, the service provider 702 may implement any of the operations discussed in reference to the device 602. For example, the service provider 702 may perform operations to facilitate a communication session (e.g., receive data from the device 602, analyze the data, generate data, forward data onto another device to provide a representation of a user, etc.). As such, the service provider 702 may include the shared presence component 640, the data 642, the human model data 644, and/or the composite spatial data 646.

Example Processes

FIGS. 8-16 illustrate example processes 800, 900, 1000, 1100, 1200, 1300, 1400, 1500, and 1600 for employing the techniques described herein. For ease of illustration, the processes 800, 900, 1000, 1100, 1200, 1300, 1400, 1500, and 1600 will be described as being performed by a computing device. For example, one or more of the individual operations of the processes 800, 900, 1000, 1100, 1200, 1300, 1400, 1500, and 1600 may be performed by the device 602, the service provider 702, and/or any other device. However, the processes 800, 900, 1000, 1100, 1200, 1300,

1400, 1500, and 1600 may be performed in other architectures. Moreover, the architecture 100 may be used to perform other processes.

The processes 800, 900, 1000, 1100, 1200, 1300, 1400, 1500, and 1600 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

Figure 8:
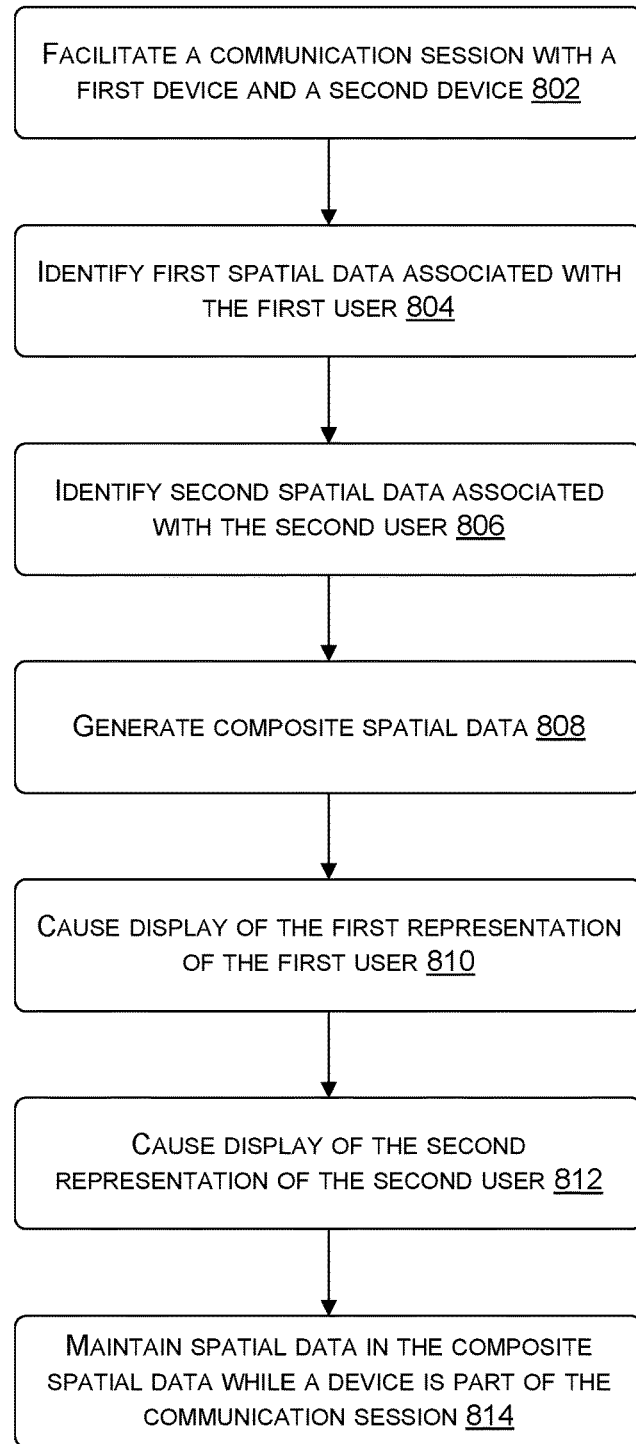
FIG. 8 illustrates an example process of generating composite spatial data to maintain spatial alignment of users in a physical environment and/or spatial alignment of representations in a coordinate system.

FIG. 8 illustrates the example process 800 of generating composite spatial data to maintain spatial alignment of users in a physical environment and/or spatial alignment of representations in a coordinate system.

At 802, a computing device may facilitate a communication session with a first device and a second device. For example, the computing device may initiate the communication session between the first device and the second device. The first device may be associated with a first user and the second device may be associated with a second user. The first user may be represented in the communication session with a first representation and the second user may be represented in the communication session with a second representation. In some instances, the first user and the second user are located in the same physical environment, while in other instances the first user and the second user are located in separate physical environments. Although two users are discussed, any number of users may be part of the communication session. To illustrate, the communication session may include the first user and the second user located in the same physical environment and a third user located in a different physical environment. The communication session may be implemented in a peer-to-peer (P2P) manner, with a service provider, or in any other manner.

At 804, the computing device may identify first spatial data associated with the first user. For example, the computing device may receive the first spatial data from the first device (e.g., when the process 800 is being performed by a service provider), determine first spatial data (e.g., when the process 800 is being performed by the first device or a service provider), etc. The first spatial data may indicate a first reference frame for the first user, a position of the first user or the first representation relative to the first reference frame, etc. A reference frame may comprise a virtual reference frame (e.g., an origin of a coordinate system for a virtual environment) and/or a physical reference frame (e.g., an anchor point in a physical environment, such as a person, object, etc.).

At 806, the computing device may identify second spatial data associated with the second user. For example, the computing device may receive the second spatial data from the first device (e.g., when the process 800 is being performed by the first device or a service provider). The second spatial data may indicate a second reference frame for the second user, a position of the second user or the second representation relative to the second reference frame, etc. In some instances when the first user and the second user are located in the same physical or virtual environment, the first reference frame and the second reference frame may be the same (e.g., a common spatial anchor or virtual point).

At 808, the computing device may generate composite spatial data. The composite spatial data may include and/or be based on the first spatial data and the second spatial data. The composite spatial data may indicate a virtual point (e.g., in a coordinate system) that is shared for the first spatial data and the second spatial data, a position of the first user or the first representation relative to the virtual point, a position of the second user or the second representation relative to the virtual point, etc. The composite spatial data may include spatial data for any number of users or representations that are part of the communication session.

At 810, the computing device may cause display of the first representation of the first user. For example, the computing device may cause display of the first representation to the second user via the second device (e.g., send data to be displayed via the second device, render the first representation, etc.). The first representation may be positioned within a coordinate system based on the composite spatial data (e.g., the first spatial data included in the composite spatial data). The first representation may be positioned within the coordinate system to maintain the position of the first user relative to the first reference frame.

At 812, the computing device may cause display of the second representation of the second user. For example, the computing device may cause display of the second representation to the first user via the first device (e.g., send data to be displayed via the first device, render the second representation, etc.). The second representation may be positioned within a coordinate system based on the composite spatial data (e.g., the second spatial data included in the composite spatial data). The second representation may be positioned within the coordinate system to maintain the position of the second user relative to the second reference frame. In some instances where the first user and the second user are in the same physical environment, the second representation may be positioned in the coordinate system relative to the first representation such that a location of the first representation relative to the second representation is scaled to a location of the first user relative to the second user in the physical environment.

At 814, the computing device may maintain spatial data in the composite spatial data while a device is part of the communication session. For example, while the first device is connected to the communication session, the computing device may maintain the first spatial data for the first user in the composite spatial data. If the first device disconnects from the communication session, the first spatial data may be removed from the composite spatial data. This may allow the position of the first user or first representation relative to the first reference frame to be maintained.

Figure 9:
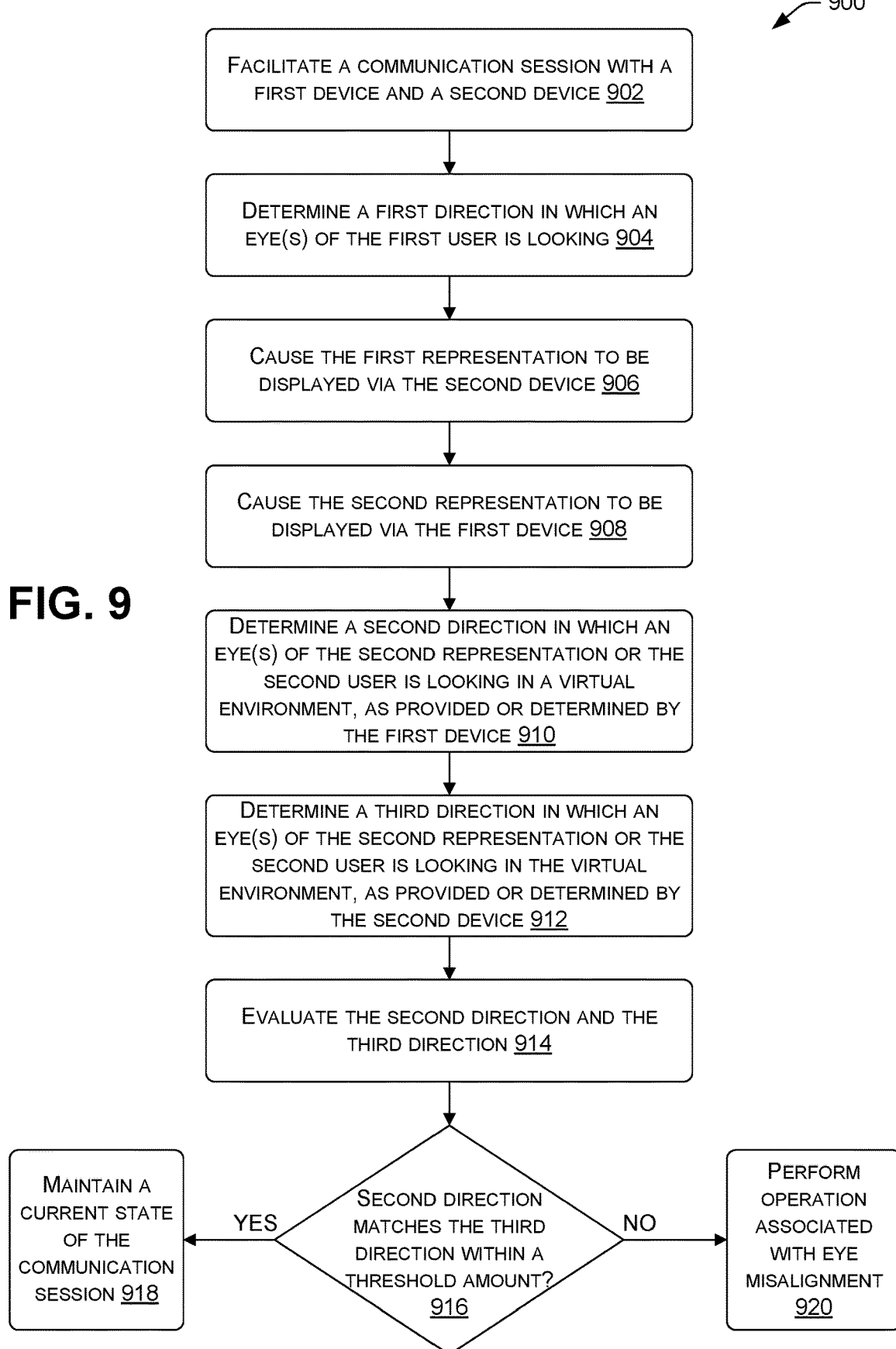
FIG. 9 illustrates an example process of evaluating eye alignment of users and/or representations that are participating in a communication session.

FIG. 9 illustrates the example process 900 of evaluating eye alignment of users and/or representations that are participating in a communication session.

At 902, a computing device may facilitate a communication session with a first device and a second device. For example, the computing device may initiate the communication session between the first device and the second device. The first device may be associated with a first user and the second device may be associated with a second user. The first user may be represented in the communication session with a first representation and the second user may be represented in the communication session with a second representation. Although two users are discussed, any number of users may be part of the communication session.

At 904, the computing device may determine a first direction in which an eye(s) of the first user is looking (e.g., within a physical environment). For example, the computing device may receive (from the first device) or capture eye tracking data indicating the first direction in which the eye(s) of the first user is looking. The eye tracking data may be generated by an eye tracking sensor on the first device. The first direction may be relative to a reference frame, such as an origin of a coordinate system, the second user, etc. In some instances, at 904, the computing device may determine if the first direction in which the eye(s) of the first user is looking matches a direction in which an eye(s) of the first representation is looking within a virtual environment (e.g., relative to a reference frame).

At 906, the computing device may cause the first representation to be displayed via the second device. For example, the computing device may cause display of the first representation to the second user via the second device (e.g., send data to be displayed via the second device, render the first representation, etc.). The first representation may include an eye(s) that looks in a direction that is correlated to the first direction in which the eye(s) of the first user is looking in a physical environment. In other words, the eye(s) of the first representation may look in a same direction as the first user (e.g., relative to a reference frame).

At 908, the computing device may cause a second representation to be displayed via the first device. For example, the computing device may cause display of the second representation to the first user via the first device (e.g., send data to be displayed via the first device, render the second representation, etc.). The second representation may include an eye(s) that looks in a direction that is correlated to a direction in which the eye(s) of the second user is looking in a physical environment.

At 910, the computing device may determine a second direction in which an eye(s) of the second representation or the second user is looking in a virtual environment, as provided or determined by the first device. For example, the computing device may receive (from the first device) data indicating the second direction in which the eye(s) of the second representation or the second user is looking in the virtual environment (e.g., as displayed by the first device). The second direction may be relative to the first representation, the first user, or another reference frame. In some instances, the data may include a first image of a view of the second representation from a perspective of the first representation or the first user (e.g., an image of what the first user sees through the first device).

At 912, the computing device may determine a third direction in which an eye(s) of the second representation or the second user is looking in the virtual environment, as provided or determined by the second device. For example, the computing device may receive (from the second device) data indicating the third direction in which the eye(s) of the second representation is looking in the virtual environment (e.g., as provided by the second device). The third direction may be relative to the first representation or another reference frame. In some instances, the data may include a second image representing an estimated view of the second representation from a perspective of the first representation.

At 914, the computing device may evaluate the second direction and the third direction. In some instances, the computing device may represent the second direction with a first vector/line (e.g., a vector/line origination from and coming out of an eye of the second representation) and represent the third direction with a second vector/line (e.g., a vector/line origination from and coming out of an eye of the second representation). The computing device may then compare the first vector/line to the second vector/line. Further, in some instances, the computing device may compare a first image of a view of the second representation from a perspective of the first representation or the first user to a second image representing an estimated view of the second representation from a perspective of the first representation.

At 916, the computing device may determine if the second direction matches the third direction within a threshold amount (e.g., the second direction and the third direction are substantially aligned). The determination at 916 may be based on the evaluation at 914. In some instances, the determination at 916 may include determining if the first vector/line that represents the second direction (in which the eye(s) of the second representation or the second user is looking, as provided or determined by the first device) matches the second vector/line that represents the third direction (in which the eye(s) of the second representation or the second user is looking, as provided or determined by the second device) by at least a threshold amount. This may include determining if the first vector/line and the second vector/line are located within a threshold distance to each other (e.g., start at the same location), have the same angle within a threshold number of degrees (e.g., with respect to an origin of a coordinate system), have the same magnitude within a threshold amount, etc. Further, in some instances, the determination at 916 may include determining if a direction in which the eye(s) of the second representation is looking in a first image (of a view of the second representation from a perspective of the first representation or the first user) matches a direction in which the eyes of the second representation are looking in a second image (representing an estimated view of the second representation from a perspective of the first representation or the first user).

If the computing device determines that the second direction matches the third direction within a threshold amount, the process 900 may proceed to 918. Alternatively, if the computing device determines that the second direction does not match the third direction within a threshold amount, the process 900 may proceed to 920.

At 918, the computing device may maintain a current state of the communication session (e.g., allow the communication session to proceed as it was currently doing). However, in other examples, the computing device may perform other operations at 918, such as providing a notification to a user or system indicating that the communication session has shared presence or that the users/representations are aligned.

At 920, the computing device may perform an operation associated with eye misalignment. For example, the communication session may be a first type of communication session associated with displaying a representation based on eye data (e.g., aligning eyes). Here, at 920, the computing device may switch from the first type of communication session to a second type of communication session that is not associated with eye data (e.g., does not align eyes). The second type of communication session may be a more generic type of communication session that allows the first user and the second user to communicate without eye alignment, such as a communication session that uses representations of users without eye alignment, a communication session that uses video or voice (e.g., video conference, voice conference, etc.). In another example, at 920, the computing device may cause the first device and/or the second device to restart, cause an eye tracking sensor, depth sensor, or other sensor associated with the first device and/or the second device to restart, and so on. This may assist in resetting components involved in the communication session in hopes of reestablishing shared presence that includes eye alignment.

In some examples, the process 900 may be performed periodically and/or in response to another event, such as a user joining the communication session. Further, the process 900 may be performed for each device or user that is part of the communication session (e.g., to maintain shared presence for any number of users).

Figure 10:
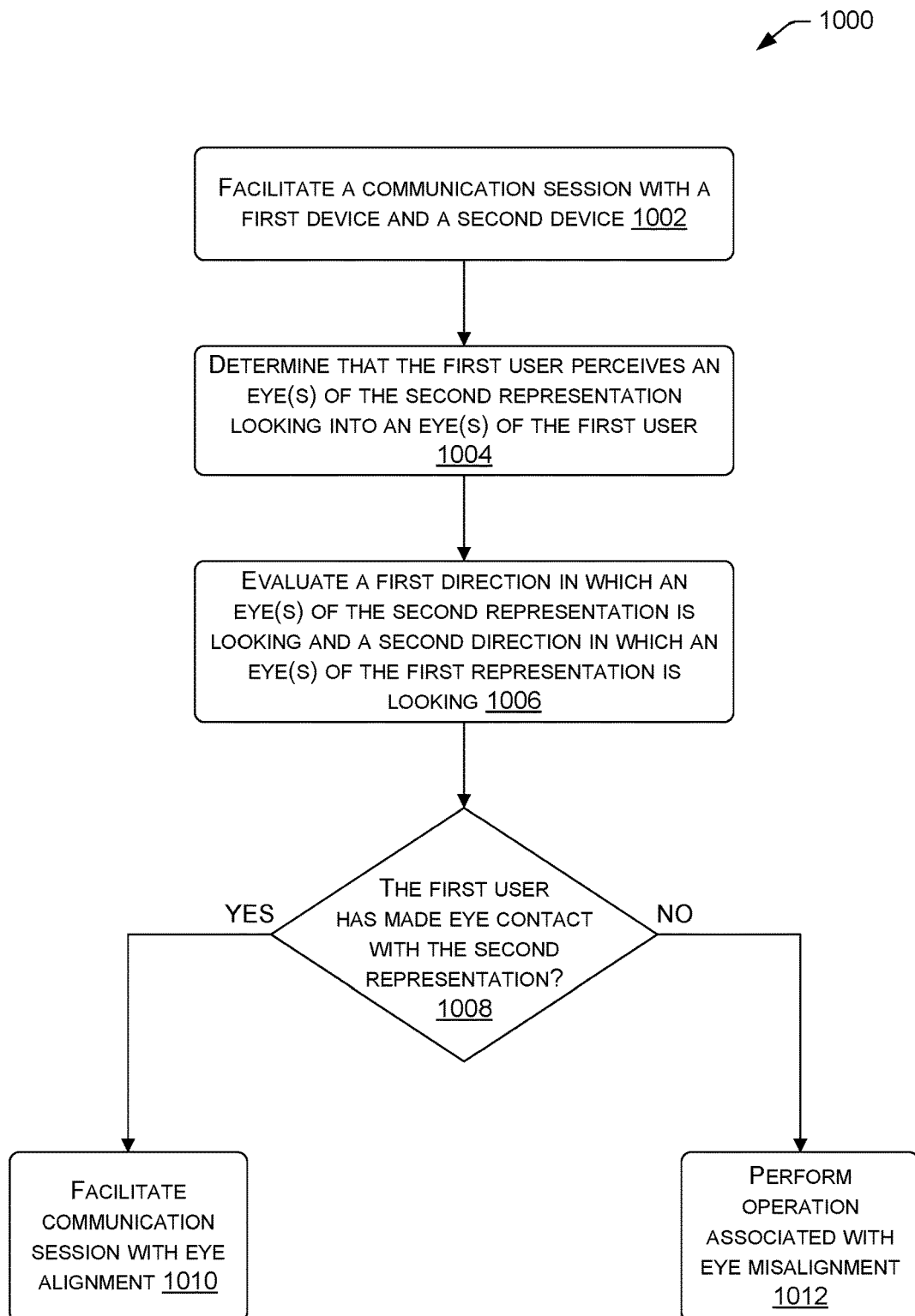
FIG. 10 illustrates an example process of evaluating a communication session to determine if users or representations are looking at each other.

FIG. 10 illustrates the example process 1000 of evaluating a communication session to determine if users or representations are looking at each other.

At 1002, a computing device may facilitate a communication session with a first device and a second device. For example, the computing device may calibrate the first device and the second device for the communication session to have eye alignment. The first device may be associated with a first user and the second device may be associated with a second user. The first user may be represented within a coordinate system with a first representation and the second user may be represented within the coordinate system with a second representation.

At 1004, the computing device may determine that the first user perceives an eye(s) of the second representation looking into an eye(s) of the first user. In one example, the computing device may receive user input (e.g., originating from the first user) indicating that the first user perceives the eye(s) of the second representation looking into the eye(s) of the first user. In another example, the computing device may receive (or capture) eye tracking data for the first user from an eye tracking sensor associated with the first device. Based on the eye tracking data, the computing device may determine a direction in which the eye(s) of the first user is looking. The computing device may determine that the direction in which the eye(s) of the first user is looking is towards the eye(s) of the second representation that is displayed by the first device.

At 1006, the computing device may evaluate a first direction in which the eye(s) of the second representation is looking and a second direction in which an eye(s) of the first representation is looking. In one example, the computing device may evaluate the first direction in which the eye(s) of the second representation is looking in the coordinate system, as displayed by the first device, and the second direction in which the eye(s) of the first representation is looking in the coordinate system, as displayed by the second device. To do so, the computing device may represent the first direction with a first vector/line (e.g., a vector/line origination from and coming out of an eye of the second representation) and represent the second direction with a second vector/line (e.g., a vector/line originating from and coming out of an eye of the first representation). The computing device may then compare the first vector/line to the second vector/line.

At 1008, the computing device may determine if the first user has made eye contact with the second representation. In one example, the computing device may determine, based on the evaluation at 1006, if the first vector/line matches the second vector/line within a threshold amount (e.g., does the first vector/line align with or point at the second vector/line, such as being located along a same axis within a threshold number of degrees).

If the computing device determines that the first user has made eye contact with the second representation, the process 1000 may proceed to 1010. Alternatively, if the computing device determines that the first user has not made eye contact with the second representation, the process 1000 may proceed to 1012.

At 1010, the computing device may facilitate the communication session with eye alignment. For example, the computing device may allow the communication session to proceed with eye alignment (e.g., initiate the communication session with eye alignment). However, in other examples, the computing device may perform other operations at 1010, such as providing a notification to a user or system indicating that the communication session has established eye alignment.

At 1012, the computing device may perform an operation associated with eye misalignment. For example, the computing device may provide a notification to a user or system indicating that the communication session has not established eye alignment. Alternatively, or additionally, the computing device may initiate the communication session without eye alignment, cause the first device and/or the second device to restart, cause an eye tracking sensor, depth sensor, or other sensor associated with the first device and/or the second device to restart, and so on.

In some examples, the process 1000 occurs as part of a calibration process when the first device and/or the second device joins the communication session. For example, the first user and the second user may be asked to look at each other in the eyes (e.g., one user to look at the eyes of the representation of the other user), and confirm eye contact through voice input, a button on a controller, etc. In other examples, the process 1000 may be performed at other times.

Figure 11:
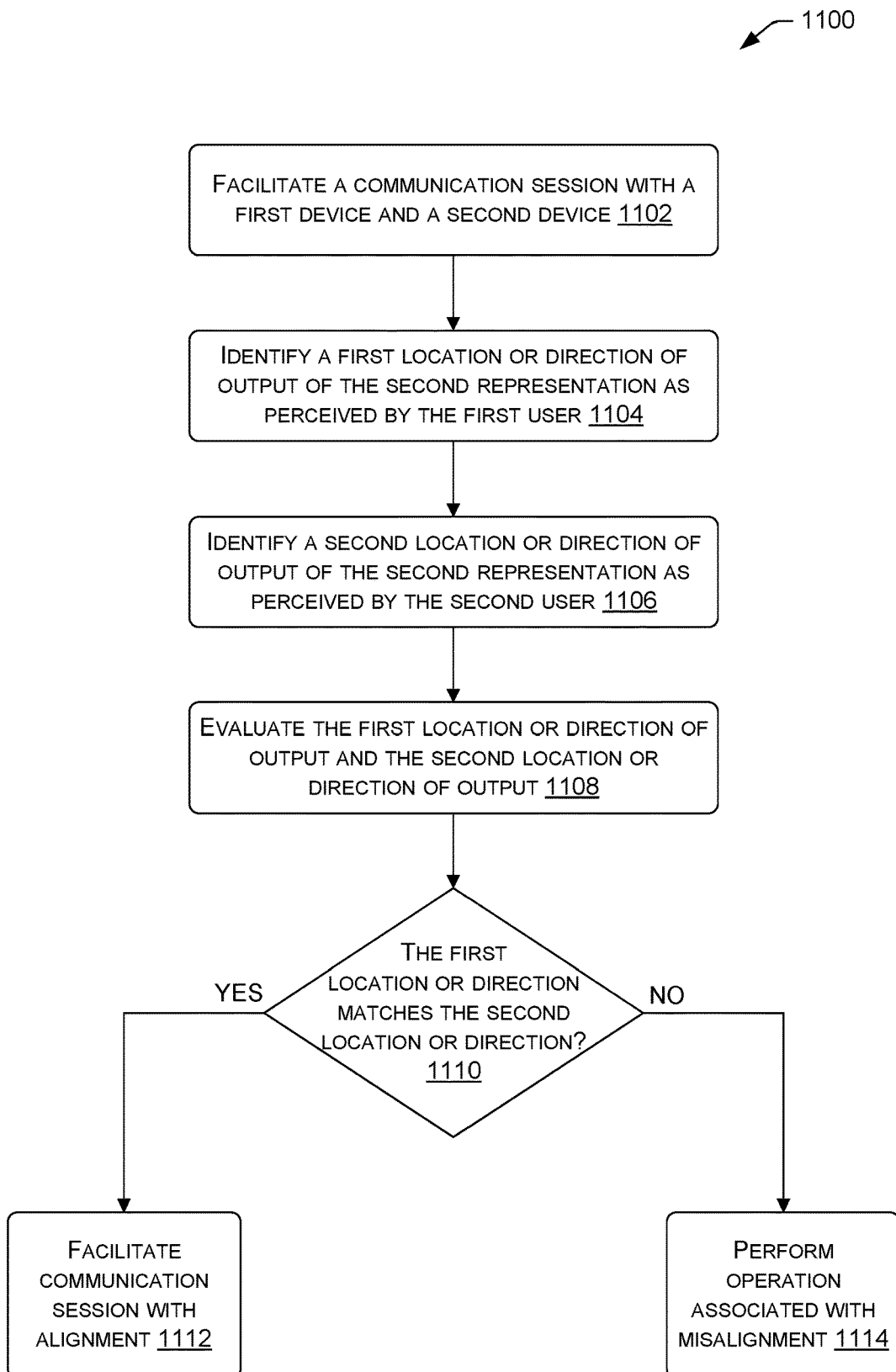
FIG. 11 illustrates the example process of evaluating outputs of a representation that is part of a communication session.

FIG. 11 illustrates the example process 1100 of evaluating outputs of a representation that is part of a communication session.

At 1102, a computing device may facilitate a communication session with a first device and a second device. For example, the computing device may initiate the communication session between the first device and the second device. The first device may be associated with a first user and the second device may be associated with a second user. The first user may be represented within a coordinate system with a first representation and the second user may be represented within the coordinate system with a second representation.

At 1104, the computing device may identify a first location or direction of output of the second representation as perceived by the first user. For example, the computing device may receive data from the first device (or determine) the first location or direction of output of the second representation as perceived by the first user. The output may include sound, touch, displayed eyes, etc.

At 1106, the computing device may identify a second location or direction of output of the second representation as perceived by the second user. For example, the computing device may receive data from the second device (or determine) the second location or direction of output of the second representation as perceived by the second user. The output may include sound, touch, displayed eyes, etc.

At 1108, the computing device may evaluate the first location or direction of output and the second location or direction of output. For example, the computing device may compare the first location or direction of output to the second location or direction of output.

At 1110, the computing device may determine if the first location or direction matches the second location or direction. For example, based on the evaluation at 1108, the computing device may determine if the first location or direction matches the second location or direction within a threshold amount.

If the computing device determines that the first location or direction matches the second location or direction, the process 1100 may proceed to 1112. Alternatively, if the computing device determines that the first location or direction does not match the second location or direction, the process 1100 may proceed to 1114.

At 1112, the computing device may facilitate the communication session with alignment. For example, the computing device may allow the communication session to proceed with alignment (e.g., initiate the communication session with alignment). However, in other examples, the computing device may perform other operations at 1112, such as providing a notification to a user or system indicating that the communication session has established alignment.

At 1114, the computing device may perform an operation associated with misalignment. For example, the computing device may provide a notification to a user or system indicating that the communication session has not established alignment or lost alignment. Alternatively, or additionally, the computing device may initiate or continue the communication session without alignment, cause the first device and/or the second device to restart, cause an eye tracking sensor, depth sensor, a haptic suit, a speaker, or other sensor/component associated with the first device and/or the second device to restart, and so on.

In some examples, the process 1100 occurs as part of a calibration process when the first device and/or the second device joins the communication session. In other examples, the process 1100 may be performed at other times, such as any time during a communication session.

Figure 12:
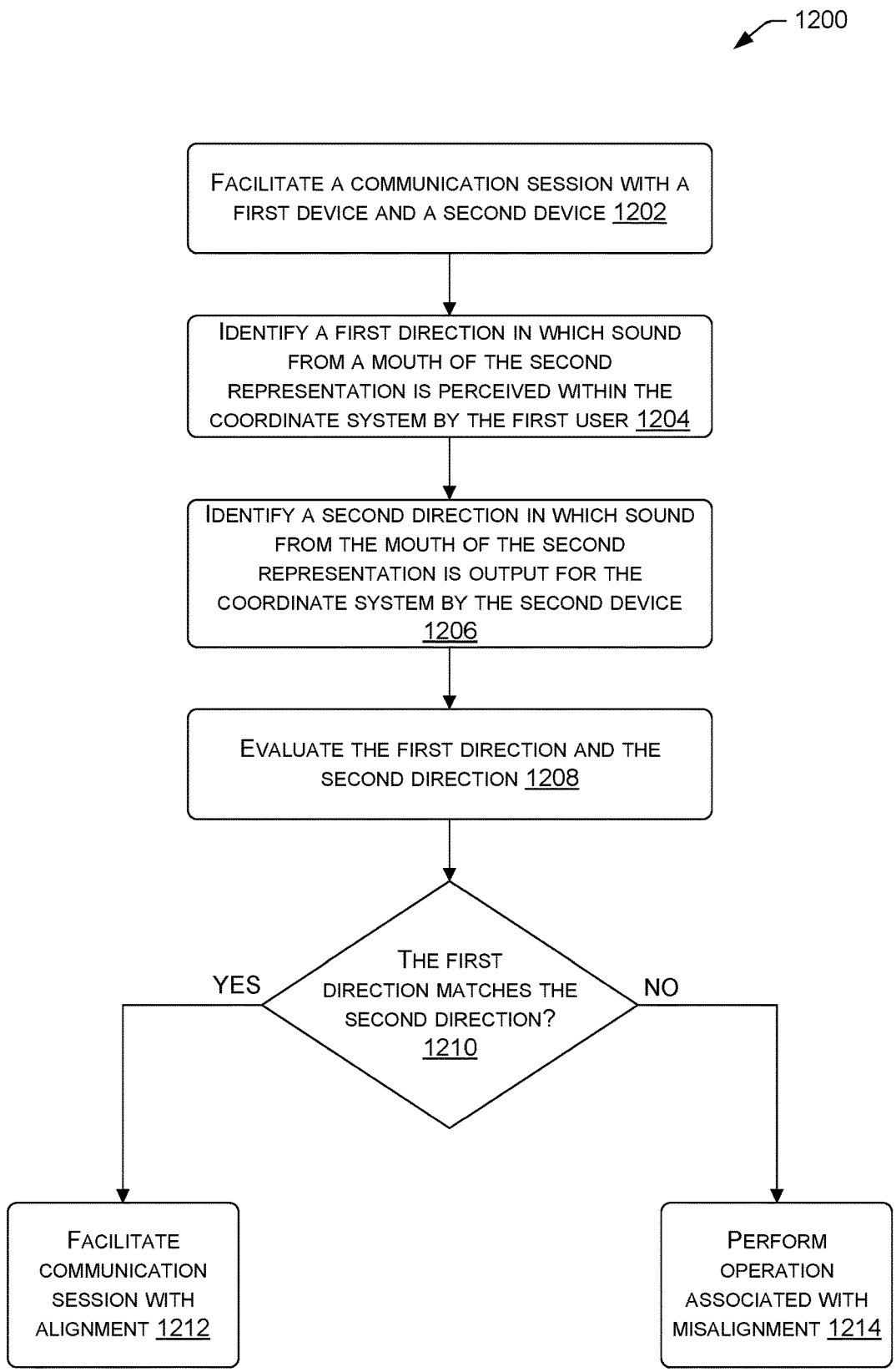
FIG. 12 illustrates an example process of evaluating sounds associated with a representation that is part of a communication session.

FIG. 12 illustrates the example process 1200 of evaluating sounds associated with a representation that is part of a communication session.

At 1202, a computing device may facilitate a communication session with a first device and a second device. For example, the computing device may initiate the communication session between the first device and the second device. The first device may be associated with a first user and the second device may be associated with a second user. The first user may be represented within a coordinate system with a first representation and the second user may be represented within the coordinate system with a second representation.

At 1204, the computing device may identify a first direction in which sound from a mouth of the second representation is perceived within the coordinate system by the first user. For example, the computing device may receive from the first device (or determine) data indicating the first direction. In some instances, the data describes a vector/line representing the first direction. To illustrate, the computing device may analyze audio data indicating a location of in which audio from a speaker of the first device is directed and/or mouth data indicating a location of a mouth of the second representation within the coordinate system as perceived by the first user. Based on such analysis, the computing device may determine the first direction.

At 1206, the computing device may identify a second direction in which sound from the mouth of the second representation is output for the coordinate system by the second device. For example, the computing device may receive from the second device (or determine) data indicating the second direction. In some instances, the data describes a vector/line representing the second direction. To illustrate, the computing device may analyze audio data that is sent by the second device describing a location for outputting sound for the mouth of the second representation and/or mouth data that is sent by the second device describing a location of the mouth of the second representation within the coordinate system.

At 1208, the computing device may evaluate the first direction and the second direction. For example, the computing device may represent the first direction with a first vector/line (e.g., a vector/line origination from and coming out of the mouth of the second representation as perceived by the first device) and represent the second direction with a second vector/line (e.g., a vector/line originating from and coming out of the mouth of the second representation as provided by the second device). The computing device may then compare the first vector/line to the second vector/line. In some examples, the first vector may include a magnitude that corresponds to a loudness of the sound from the mouth of the second representation that is perceived by the first user or output by the first device. Meanwhile, the second vector may have a magnitude that corresponds to a loudness of the sound from the mouth of the second representation that is provided by the second device.

At 1210, the computing device may determine if the first direction matches the second direction. For example, the computing device may determine, based on the evaluation at 1208, if the first direction matches the second direction within a threshold amount. In some instances, the determination at 1210 may include determining if the first vector/line matches the second vector/line by at least a threshold amount. This may include determining if the first vector/line and the second vector/line are located within a threshold distance to each other (e.g., start at the same location), have the same angle within a threshold number of degrees (e.g., with respect to an origin of a coordinate system), have the same magnitude within a threshold amount, etc.

If the computing device determines that the first direction matches the second direction, the process 1200 may proceed to 1212. Alternatively, if the computing device determines that the first direction does not match the second direction, the process 1200 may proceed to 1214.

At 1212, the computing device may facilitate the communication session with alignment. For example, the computing device may allow the communication session to proceed with alignment (e.g., initiate the communication session with alignment). However, in other examples, the computing device may perform other operations at 1212, such as providing a notification to a user or system indicating that the communication session has established alignment.

At 1214, the computing device may perform an operation associated with misalignment. For example, the computing device may provide a notification to a user or system indicating that the communication session has not established alignment or lost alignment. Alternatively, or additionally, the computing device may initiate or continue the communication session without alignment, cause the first device and/or the second device to restart, cause an eye tracking sensor, depth sensor, a haptic device, a speaker, a microphone, or other sensor/component associated with the first device and/or the second device to restart, and so on.

In some examples, the process 1200 occurs as part of a calibration process when the first device and/or the second device joins the communication session. In other examples, the process 1200 may be performed at other times, such as any time during a communication session.

Figure 13:
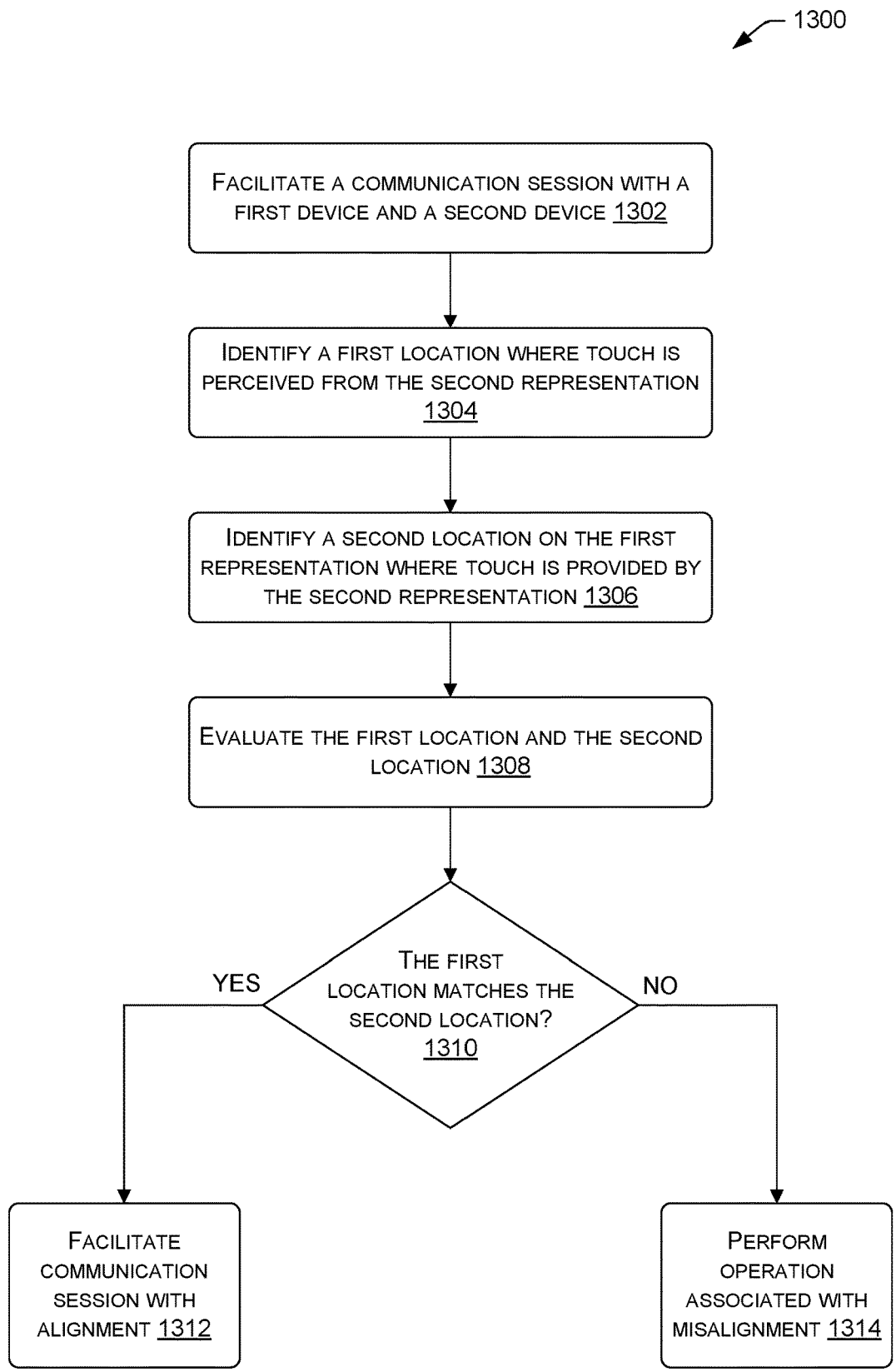
FIG. 13 illustrates an example process of evaluating touch associated with a representation that is part of a communication session.

FIG. 13 illustrates the example process 1300 of evaluating touch associated with a representation that is part of a communication session.

At 1302, a computing device may facilitate a communication session with a first device and a second device. For example, the computing device may initiate the communication session between the first device and the second device. The first device may be associated with a first user and the second device may be associated with a second user. The first user may be represented within a coordinate system with a first representation and the second user may be represented within the coordinate system with a second representation. In some examples, the first device and/or the second device include a haptic device configured to detect touch from a user and/or apply force/vibration to a user to simulate a touch or other contact on the user.

At 1304, the computing device may identify a first location where touch is perceived from the second representation. For example, the computing device may receive from the first device (or determine) data indicating the first location. In some instances, the data describes a vector/line representing the first location. To illustrate, the computing device may receive data from the first device indicating a location on the first user's body where touch is perceived (by the first user through the first device) from the second representation within the coordinate system. In other words, the data may indicate where the second representation or the second user touched the first user's body. In some examples, the computing device may analyze an image of a view the first user sees through the first device to determine where the second representation appears to touch the first user or the first representation.

At 1306, the computing device may identify a second location on the first representation where touch is provided by the second representation. For example, the computing device may receive from the second device (or determine) data indicating the second location. In some instances, the data describes a vector/line representing the second location. To illustrate, the computing device may receive data from the second device indicating a location on a body of the first representation where the second user or the second representation contacted the first representation. In other words, the data may indicate where the second representation or the second user touched the first user's body. In some examples, the computing device may analyze an image of a view the second user sees through the second device to determine where the second representation appears to touch the first user or the first representation.

At 1308, the computing device may evaluate the first location and the second location. For example, the computing device may represent the first location with a first vector/line (e.g., a vector/line origination from and coming out of a finger of the second representation as perceived by the first user) and represent the second location with a second vector/line (e.g., a vector/line originating from and coming out of the finger of the second representation as provided by the second device). The computing device may then compare the first vector/line to the second vector/line. In some examples, the first vector may include a magnitude that corresponds to a force of the touch that is perceived on the first representation. Meanwhile, the second vector may have a magnitude that corresponds to a force that is provided by the second representation or the second user (e.g., an amount of force that the second user provides through a haptic suit or other input device).

At 1310, the computing device may determine if the first location matches the second location. For example, the computing device may determine, based on the evaluation at 1308, if the first location matches the second location within a threshold amount. In some instances, the determination at 1310 may include determining if the first vector/line matches the second vector/line by at least a threshold amount. This may include determining if the first vector/line and the second vector/line are located within a threshold distance to each other (e.g., start at the same location), have the same angle within a threshold number of degrees (e.g., with respect to an origin of a coordinate system), have the same magnitude within a threshold amount, etc. In some instances, direction of a touch may correspond to a direction in which a force is applied, such as a representation pushing another representation in a direction.

If the computing device determines that the first location matches the second location, the process 1300 may proceed to 1312. Alternatively, if the computing device determines that the first location does not match the second location, the process 1300 may proceed to 1314.

At 1312, the computing device may facilitate the communication session with alignment. For example, the computing device may allow the communication session to proceed with alignment (e.g., initiate the communication session with alignment). However, in other examples, the computing device may perform other operations at 1312, such as providing a notification to a user or system indicating that the communication session has established alignment.

At 1314, the computing device may perform an operation associated with misalignment. For example, the computing device may provide a notification to a user or system indicating that the communication session has not established alignment or lost alignment. Alternatively, or additionally, the computing device may initiate or continue the communication session without alignment, cause the first device and/or the second device to restart, cause an eye tracking sensor, depth sensor, a haptic device, a speaker, a microphone, or other sensor/component associated with the first device and/or the second device to restart, and so on.

In some examples, the process 1300 occurs as part of a calibration process when the first device and/or the second device joins the communication session. In other examples, the process 1300 may be performed at other times, such as any time during a communication session.

Figure 14:
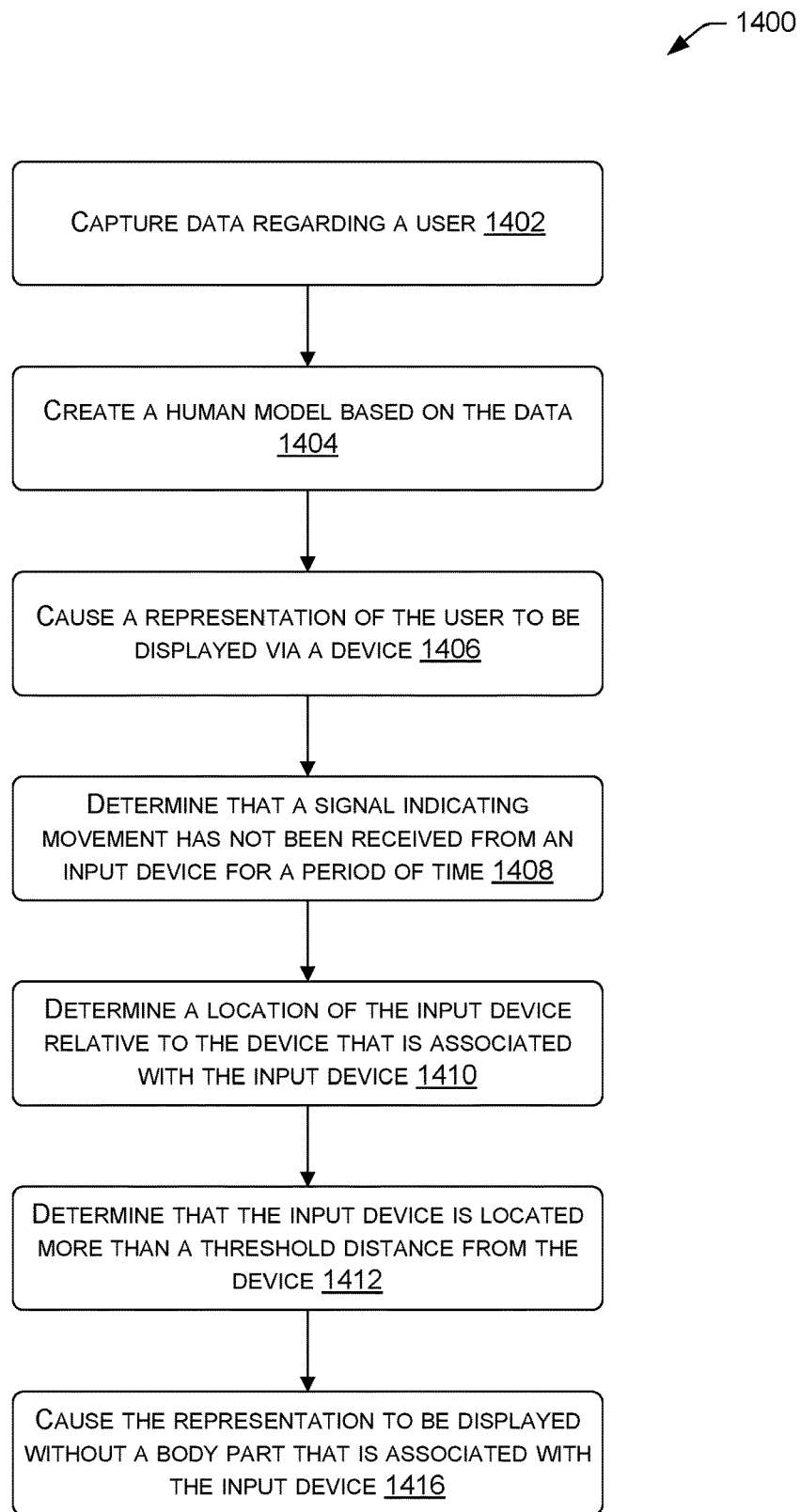
FIG. 14 illustrates an example process of creating a human model and using the human model to evaluate user interaction.

FIG. 14 illustrates the example process 1400 of creating a human model and using the human model to evaluate user interaction.

At 1402, a computing device may capture data regarding a user. The data may include an image of the user, depth data for the user, eye tracking data for the user, and so on.

At 1404, the computing device may create a human model (e.g., human model data) based on the data captured at 1402. The human model may represent body parts of the user. For example, body parts of the human model may be scaled to sizes, shapes, positions, etc. of body parts of the user.

At 1406, the computing device may cause a representation of the user to be displayed via a device. In some examples, the device is the computing device, while in other examples the device is another device. The representation may be based on the human model. For example, body parts of the representation may be scaled to sizes, shapes, positions, etc. of body parts of the human model. In some instances, if the human model includes information about just the head and hands of the user, the representation may include just a head and hands.

At 1408, the computing device may determine that a signal indicating movement has not been received from an input device for a period of time. For example, the computing device may determine that the input device has not been moved for more than a threshold amount of time, since the computing device has not received a signal from the input device indicating movement of the input device. The input device be a controller or any other input device.

At 1410, the computing device may determine a location of the input device relative to the device that is associated with the input device (e.g., a device that is paired or otherwise associated with the input device). For example, in response to determining that the signal indicating movement has not been received from the input device for the period of time at 1408, the computing device may determine a distance/proximity of the input device to the device that is associated with the input device.

At 1412, the computing device may determine that the input device is located more than a threshold distance from the device. For example, based on the human model and the location of the input device relative to the device, the computing device may determine that the input device is located more than a threshold distance from the device or the user that is employing the device. Here, the computing device may reference the human model to determine that a body part that uses the input device is located relatively far from the device (e.g., a controller is relatively far from a headset).

At 1414, the computing device may cause the representation to be displayed without a body part that is associated with the input device. For example, if the input device is a hand controller and the device is a headset, and it has been determined at 1412 that the hand controller is far from the headset (e.g., indicating that the user has put down the hand controller), the computing device may cause the representation to be displayed without a hand. In some instances, such as when a communication session is implemented by a service provider, this includes sending an instruction to an output device to not display the body part for the representation.

Figure 15:
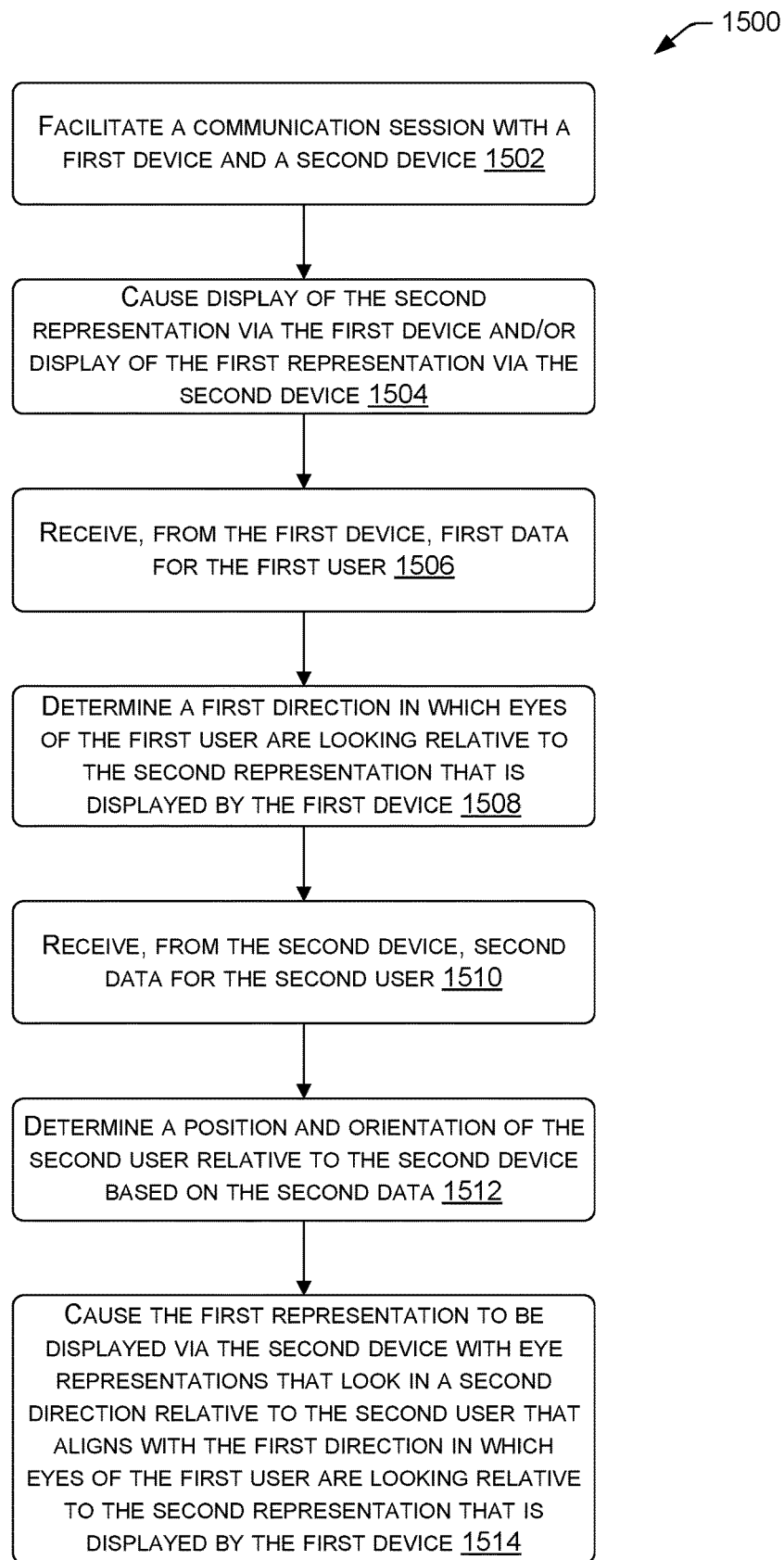
FIG. 15 illustrates an example process of causing a representation to be displayed with eye representations that look in a direction that corresponds to a direction in which a user is looking in a physical environment.

FIG. 15 illustrates the example process 1500 of causing a representation to be displayed with eye representations that look in a direction that corresponds to a direction in which a user is looking in a physical environment.

At 1502, a computing device may facilitate a communication session with a first device and a second device. For example, the computing device may initiate the communication session between the first device and the second device. The first device may be associated with a first user and the second device may be associated with a second user. The first user may be represented with a first representation and the second user may be represented with a second representation. The communication session may include a videotelephony session, a virtual reality session, an augmented reality session, or any other session.

In some examples, the first representation includes data from a first image of the first user and/or the second representation includes data from a second image of the second user. Further, in some examples, the first representation is displayed in an overlaid manner on top of a face depicted in a real-time image of the first user and/or the second representation is displayed in an overlaid manner on top of a face depicted in a real-time image of the second user. Moreover, in some examples, the first representation represents a face of the first user and/or the second representation represents a face of the second user.

At 1504, the computing device may cause display of the second representation via the first device and/or cause display of the first representation via the second device. For example, the computing device may generate the first representation and/or send the first representation to the second device. Further, in some examples, when the computing device determines that a direction in which eyes of the first user are looking is at eye representations of the second representation that are displayed by the first device, the computing device may cause the first representation to be displayed via the second device with the eye representations of the first representation looking at eyes of the second user.

At 1506, the computing device may receive, from the first device, first data for the first user. The first data may include a first image, first depth data, etc.

At 1508, the computing device may determine a first direction in which eyes of the first user are looking relative to the second representation that is displayed by the first device. This may be based on the first data.

At 1510, the computing device may receive, from the second device, second data for the second user. The second data may include a second image, second depth data, etc.

At 1512, the computing device may determine a position and orientation of the second user relative to the second device based on the second data.

At 1514, the computing device may cause the first representation to be displayed via the second device with eye representations that look in a second direction relative to the second user that aligns with the first direction in which eyes of the first user are looking relative to the second representation that is displayed by the first device. This may be based on the first direction in which eyes of the first user are looking relative to the second representation that is displayed by the first device and/or the position and orientation of the second user relative to the second device.

Figure 16:
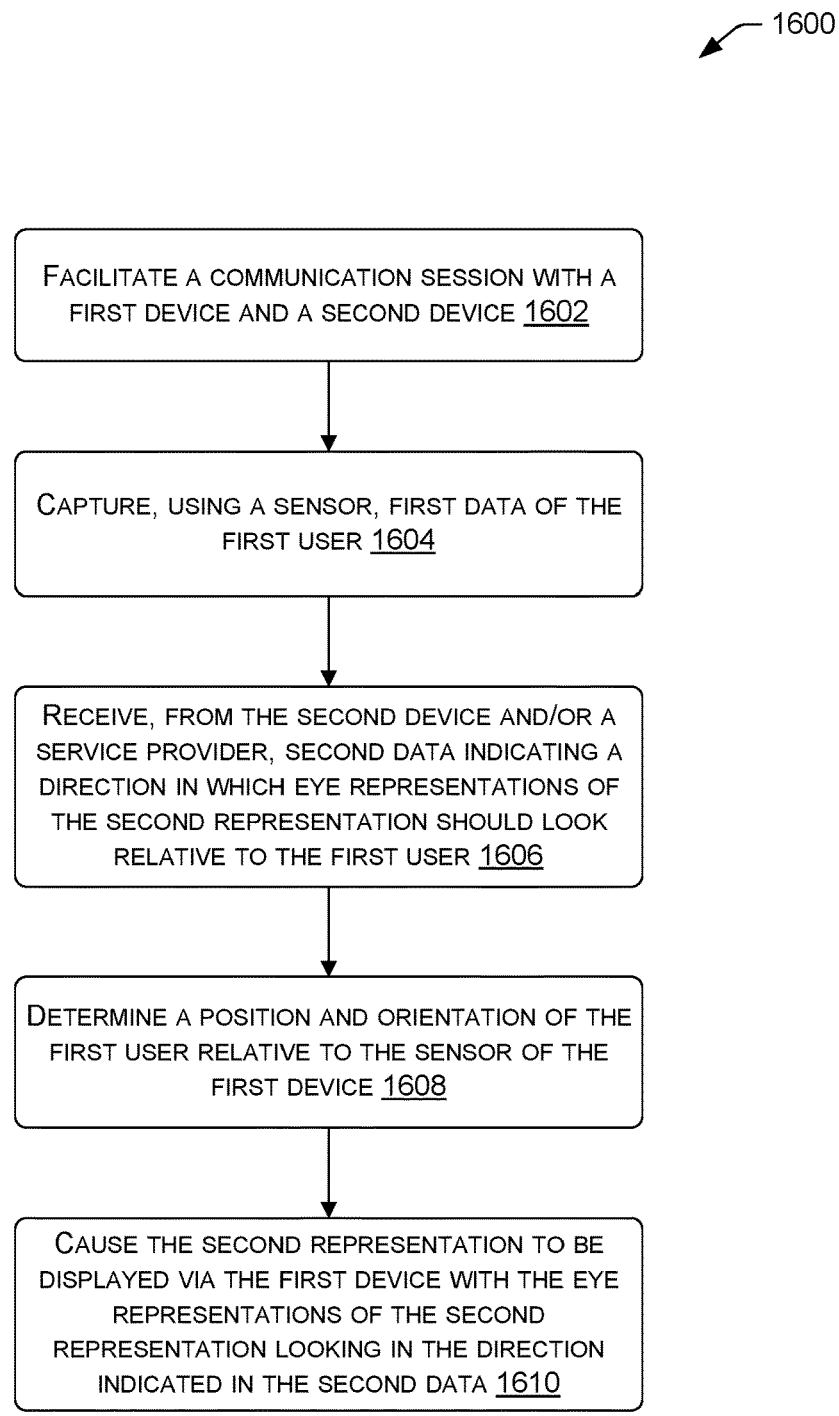
FIG. 16 illustrates an example process of causing a representation to be displayed with eye representations that look in a direction that corresponds to a direction in which a user is looking in a physical environment.

FIG. 16 illustrates the example process 1600 of causing a representation to be displayed with eye representations that look in a direction that corresponds to a direction in which a user is looking in a physical environment.

At 1602, a first device may facilitate a communication session with the first device and a second device. The first device may be associated with a first user and the second device may be associated with a second user. The first user may be represented with a first representation and the second user may be represented with a second representation.

At 1604, the first device may capture, using a sensor, first data of the first user. The first data may include an image, depth data, etc.

At 1606, the first device may receive, from the second device and/or a service provider, second data indicating a direction in which eye representations of the second representation should look relative to the first user. The direction may align with another direction in which eyes of the second user are looking relative to the first representation that is displayed via the second device.

At 1608, the first device may determine a position and orientation of the first user relative to the sensor of the first device. This may be based on the first data.

At 1610, the first device may cause the second representation to be displayed via the first device with the eye representations of the second representation looking in the direction indicated in the second data. This may be based on the first data and/or the direction in which eyes of the second representation should look relative to the first user.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   initiating a communication session with a first device associated with a first user and a second device associated with a second user, the first user being represented in the communication session with a first representation and the second user being represented in the communication session with a second representation, the communication session being associated with at least one virtual environment;
   determining, by the first device, a first direction in which eyes of the first user are looking within a physical environment;
   causing, by the first device, the first representation to be displayed via the second device, the first representation including eyes that look in a second direction that is correlated to the first direction in which the eyes of the first user are looking in the physical environment;
   causing, by the first device, the second representation to be displayed within the at least one virtual environment;
   determining, by the first device, a third direction in which eyes of the second representation are looking in the at least one virtual environment, as displayed by the first device, relative to the first representation, the third direction being correlated to a fourth direction in which eyes of the second user are looking in the physical environment or another physical environment;
   receiving, from the second device, data indicating a fifth direction in which the eyes of the second representation are looking in the at least one virtual environment, as provided by the second device, relative to the first representation; and
   determining that the third direction in which the eyes of the second representation are looking as displayed by the first device matches the fifth direction in which the eyes of the second representation are looking as provided by the second device.

2. The method of claim 1, wherein the determining that the third direction matches the fifth direction comprises:
   representing the third direction in which the eyes of the second representation are looking as displayed by the first device as a first vector;
   representing the fifth direction in which the eyes of the second representation are looking as provided by the second device as a second vector;
   comparing the first vector to the second vector; and
   based at least in part on the comparing, determining that the first vector matches the second vector.

3. The method of claim 1, further comprising:
   capturing a first image of a view of the second representation from the perspective of the first representation,
   wherein the receiving the data from the second device indicating the fifth direction comprises receiving, from the second device, a second image representing an estimated view of the second representation from the perspective of the first representation; and
   wherein the determining that the third direction matches the fifth direction comprises:
   comparing the first image to the second image; and
   determining that a direction in which the eyes of the second representation are looking in the first image matches a direction in which the eyes of the second representation are looking in the second image.

4. The method of claim 1, wherein the first user and the second user are located in the physical environment.

5. The method of claim 4, further comprising:
   receiving, from the second device, data indicating the fourth direction, the fourth direction being relative to the first user; and
   determining that the fifth direction in which the eyes of the second representation are looking as provided by the second device matches the fourth direction in which the eyes of the second user are looking within the physical environment relative to the first user.

6. The method of claim 1, wherein the second user is located in the other physical environment.

7. A system comprising: one or more processors; and memory communicatively coupled to the one or more processors and storing executable instructions that, when executed by the one or more processors, cause the one or more processors to perform operations comprising: facilitating a communication session with a first device associated with a first user and a second device associated with a second user, the first user being represented within a coordinate system with a first representation and the second user being represented within the coordinate system with a second representation; determining, by the first device, a first direction in which at least one eye of the second representation or the second user is looking in the coordinate system; receiving, from the second device, data indicating a second direction in which the at least one eye of the second representation or the second user is looking in the coordinate system; and evaluating the first direction and the second direction.

8. The system of claim 7, wherein the operations further comprise:
   based at least in part on the evaluating, determining that the first direction matches the second direction; and
   maintaining the first device and the second device in the communication session.

9. The system of claim 7, wherein the communication session is a first type of communication session associated with displaying the second representation based at least in part on eye data, and the operations further comprise:
   based at least in part on the evaluating, determining that the first direction does not match the second direction; and
   switching the communication session from the first type of communication session to a second type of communication session that does not display the second representation based at least in part on the eye data.

10. The system of claim 7, wherein the communication session is a first type of communication session associated with displaying the second representation based at least in part on eye data, and the operations further comprise:
    based at least in part on the evaluating, determining that the first direction does not match the second direction; and
    causing at least one of the first device or the second device to restart or causing an eye tracking sensor associated with at least one of the first device or the second device to restart.

11. The system of claim 7, wherein the evaluating comprises:
    representing the first direction with a first vector;
    representing the second direction with a second vector; and
    comparing the first vector to the second vector.

12. The system of claim 7, wherein:
the determining the first direction comprises capturing a first image of a view of the second representation from the perspective of the first representation;
the receiving the data from the second device comprises receiving, from the second device, a second image representing an estimated view of the second representation from the perspective of the first representation; and
the evaluating comprises comparing the first image to the second image.

13. The system of claim 7, wherein the operations further comprise:
receiving additional data regarding the first user, the additional data comprising at least one of an image of the first user, depth data for the first user, or eye tracking data for the first user;
based at least in part on the additional data, creating a human model representing the first user; and
causing the first representation for the first user to be displayed via the second device, the first representation being based at least in part on the human model.

14. The system of claim 7, wherein the operations further comprise:
determining that a signal indicating movement has not been received from an input device for a period of time, the input device being associated with the first device;
in response to determining that the signal indicating movement has not been received from the input device for the period of time, determining a location of the first device relative to the input device;
based at least in part on a human model and the location of the first device relative to the input device, determining that the input device is located more than a threshold distance from the first user; and
causing the first representation to be displayed via the second device without a body part representation that is associated with the input device.

15. A system comprising: one or more processors; and memory communicatively coupled to the one or more processors and storing executable instructions that, when executed by the one or more processors, cause the one or more processors to perform operations comprising: initiating a communication session with a first device associated with a first user and a second device associated with a second user, the first user being associated with a first representation within a coordinate system and the second user being associated with a second representation within the coordinate system; determining that the first user perceives an eye of the second representation looking into an eye of the first user; evaluating, by the first device, a first direction in which the eye of the second representation is looking in the coordinate system, as displayed by the first device, and a second direction in which an eye of the first representation is looking in the coordinate system, as displayed by the second device; and based at least in part on the evaluating, determining whether or not the first user has made eye contact with the second representation.

16. The system of claim 15, wherein the determining that the first user perceives the eye of the second representation looking into the eye of the first user comprises receiving input from the first user indicating that the first user perceives the eye of the second representation looking into the eye of the first user.

17. The system of claim 15, wherein the determining that the first user perceives the eye of the second representation looking into the eye of the first user comprises:
receiving eye tracking data for the first user from an eye tracking sensor associated with the first device;
based at least in part on the eye tracking data, determining a direction in which the eye of the first user is looking; and
determining that the direction in which the eye of the first user is looking is towards the eye of the second representation that is displayed by the first device.

18. The system of claim 15, wherein the evaluating occurs as part of a calibration process for at least one of the first device or the second device.

19. One or more non-transitory computer readable media storing executable instructions that, when executed by one or more processors, cause the one or more processors to perform operations comprising facilitating a communication session with a first device associated with a first user and a second device associated with a second user, the first user being associated with a first representation within a coordinate system and the second user being associated with a second representation within the coordinate system; identifying, by the first device, a first location or direction of output of the second representation as perceived by the first user; receiving, from the second device, data indicating a second location or direction of the output of the second representation as perceived by the second user; and evaluating the first location or direction and the second location or direction to determine whether the first location or direction matches the second location or direction.

20. The one or more non-transitory computer-readable media of claim 19, wherein the output of the second representation comprises at least one of sound, touch, or displayed eyes.

21. The one or more non-transitory computer-readable media of claim 19, wherein the first device and the second device are located in a same physical environment.

22. A system comprising: one or more processors; and memory communicatively coupled to the one or more processors and storing executable instructions that, when executed by the one or more processors, cause the one or more processors to perform operations comprising: initiating a communication session with a first device associated with a first user and a second device associated with a second user, the first user being associated with a first representation within a coordinate system and the second user being associated with a second representation within the coordinate system; determining, by the first device, a first direction in which sound from a mouth of the second representation is perceived within the coordinate system by the first user; receiving, from the second device, data indicating a second direction in which sound from the mouth of the second representation is output for the coordinate system by the second device; and evaluating the first direction and the second direction to determine whether the first direction matches the second direction.

23. The system of claim 22, wherein the evaluating the first direction and the second direction comprises:
representing the first direction as a first vector;
representing the second direction as a second vector;
comparing the first vector to the second vector; and
based at least in part on the comparing, determining whether the first vector matches the second vector.

24. The system of claim 23, wherein:
a magnitude of the first vector comprises a loudness of the sound from the mouth of the second representation that is perceived by the first user; and a magnitude of the second vector comprises a loudness of the sound from the mouth of the second representation that is output by the second device.

25. A system comprising: one or more processors; and memory communicatively coupled to the one or more processors and storing executable instructions that, when executed by the one or more processors, cause the one or more processors to perform operations comprising: initiating a communication session with a first device associated with a first user and a second device associated with a second user, the first user being associated with a first representation within a coordinate system and the second user being associated with a second representation within the coordinate system; determining, by the first device, a first location on the first representation where touch is perceived From the second representation; receiving, from the second device, data indicating a second location on the first representation where touch is provided by the second representation; and evaluating the first location and the second location to determine whether the first location matches the second location.

26. The system of claim 25, wherein the evaluating the first location and the second location comprises:
representing the first location as a first vector;
representing the second location as a second vector;
comparing the first vector to the second vector; and
based at least in part on the comparing, determining whether the first vector matches the second vector.

27. The system of claim 26, wherein:
a magnitude of the first vector comprises a force of the touch that is perceived on the first representation; and
a magnitude of the second vector comprises a force of the touch that is provided by the second representation.

\* \* \* \* \*